(12) United States Patent
Chun et al.

(10) Patent No.: US 7,426,311 B1
(45) Date of Patent: Sep. 16, 2008

(54) OBJECT-BASED CODING AND DECODING APPARATUSES AND METHODS FOR IMAGE SIGNALS

(75) Inventors: Sung Moon Chun, Seoul (KR); Jin Hak Lee, Daejun-shi (KR); Joo Hee Moon, Seoul (KR); Gwang Hoon Park, Inchon-shi (KR); Jae Kyoon Kim, Seoul (KR); Jae-won Chung, Seoul (KR)

(73) Assignee: Hyundai Electronics Industries Co. Ltd., Kyoungki-Do (KR)

( * ) Notice: Subject to any disclaimer, the term of this patent is extended or adjusted under 35 U.S.C. 154(b) by 0 days.

(21) Appl. No.: 09/195,897

(22) Filed: Nov. 19, 1998

Related U.S. Application Data

(63) Continuation-in-part of application No. 08/578,142, filed on Dec. 26, 1995, now abandoned.

(30) Foreign Application Priority Data

Oct. 26, 1995 (KR) ................................. 95-37917
Dec. 11, 1995 (KR) ................................. 95-48434

(51) Int. Cl.
*G06K 9/36* (2006.01)
(52) U.S. Cl. .................................. 382/250; 375/240.2
(58) Field of Classification Search ................. 382/239, 382/243, 245, 246, 250, 253; 341/51; 348/403–404, 348/405–407, 395, 419, 414, 417, 418, 422; 358/426.01–426.11; 704/270.1; 375/240.2
See application file for complete search history.

(56) References Cited

U.S. PATENT DOCUMENTS

| | | | | |
|---|---|---|---|---|
| 4,951,157 A | * | 8/1990 | Koh et al. | 382/253 |
| 5,045,938 A | * | 9/1991 | Sugiyama | 375/240.2 |
| 5,086,488 A | * | 2/1992 | Kato et al. | 382/239 |
| 5,339,164 A | * | 8/1994 | Lim | 358/426.02 |
| 5,598,484 A | * | 1/1997 | Suzuki et al. | 382/239 |

OTHER PUBLICATIONS

Sikora et al., "Shape-adaptive DCT for generic coding of video", IEEE Transactions, vol. 5, Issue 1, pp. 59-62, Feb. 1995.*

* cited by examiner

*Primary Examiner*—Samir Ahmed
(74) *Attorney, Agent, or Firm*—J. Harold Nissen; Lackenbach Siegel, LLP

(57) ABSTRACT

An object-based coding apparatus and method for image signals, wherein upon scanning shape-adaptive transform coefficients of an input image signal transformed in accordance with a shape-adaptive transform, only segments containing such shape-adaptive transform coefficients are scanned. In the scanning operation, segments containing no transform coefficient are skipped, thereby reducing the quantity of data being encoded. An apparatus for and a method of object-based decoding of image signals are also disclosed which can decode bit streams generated using the coding method, thereby reproducing image signals.

16 Claims, 16 Drawing Sheets

(A)

| 0 | 1 | 5 | 6 | 14 | 15 | 27 | 28 |
|---|---|---|---|----|----|----|----|
| 2 | 4 | 7 | 13 | 16 | 26 | 29 | 42 |
| 3 | 8 | 12 | 17 | 25 | 30 | 41 | 43 |
| 9 | 11 | 18 | 24 | 31 | 40 | 44 | 53 |
| 10 | 19 | 23 | 32 | 39 | 45 | 52 | 54 |
| 20 | 22 | 33 | 38 | 46 | 51 | 55 | 60 |
| 21 | 34 | 37 | 47 | 50 | 56 | 59 | 61 |
| 35 | 36 | 48 | 49 | 57 | 58 | 62 | 63 |

(B)

| 0 | 4 | 6 | 20 | 22 | 36 | 38 | 52 |
|---|---|---|----|----|----|----|----|
| 1 | 5 | 7 | 21 | 23 | 37 | 39 | 53 |
| 2 | 8 | 19 | 24 | 34 | 40 | 50 | 54 |
| 3 | 9 | 18 | 25 | 35 | 41 | 51 | 55 |
| 10 | 17 | 26 | 30 | 42 | 46 | 56 | 60 |
| 11 | 16 | 27 | 31 | 43 | 47 | 57 | 61 |
| 12 | 15 | 28 | 32 | 44 | 48 | 58 | 62 |
| 13 | 14 | 29 | 33 | 45 | 49 | 59 | 63 |

(C)

| 0 | 1 | 2 | 3 | 10 | 11 | 12 | 13 |
|---|---|---|---|----|----|----|----|
| 4 | 5 | 8 | 9 | 17 | 16 | 15 | 14 |
| 6 | 7 | 19 | 18 | 26 | 27 | 28 | 29 |
| 20 | 21 | 24 | 25 | 30 | 31 | 32 | 33 |
| 22 | 23 | 34 | 35 | 42 | 43 | 44 | 45 |
| 36 | 37 | 40 | 41 | 46 | 47 | 48 | 49 |
| 38 | 39 | 50 | 51 | 56 | 57 | 58 | 59 |
| 52 | 33 | 54 | 55 | 60 | 61 | 62 | 63 |

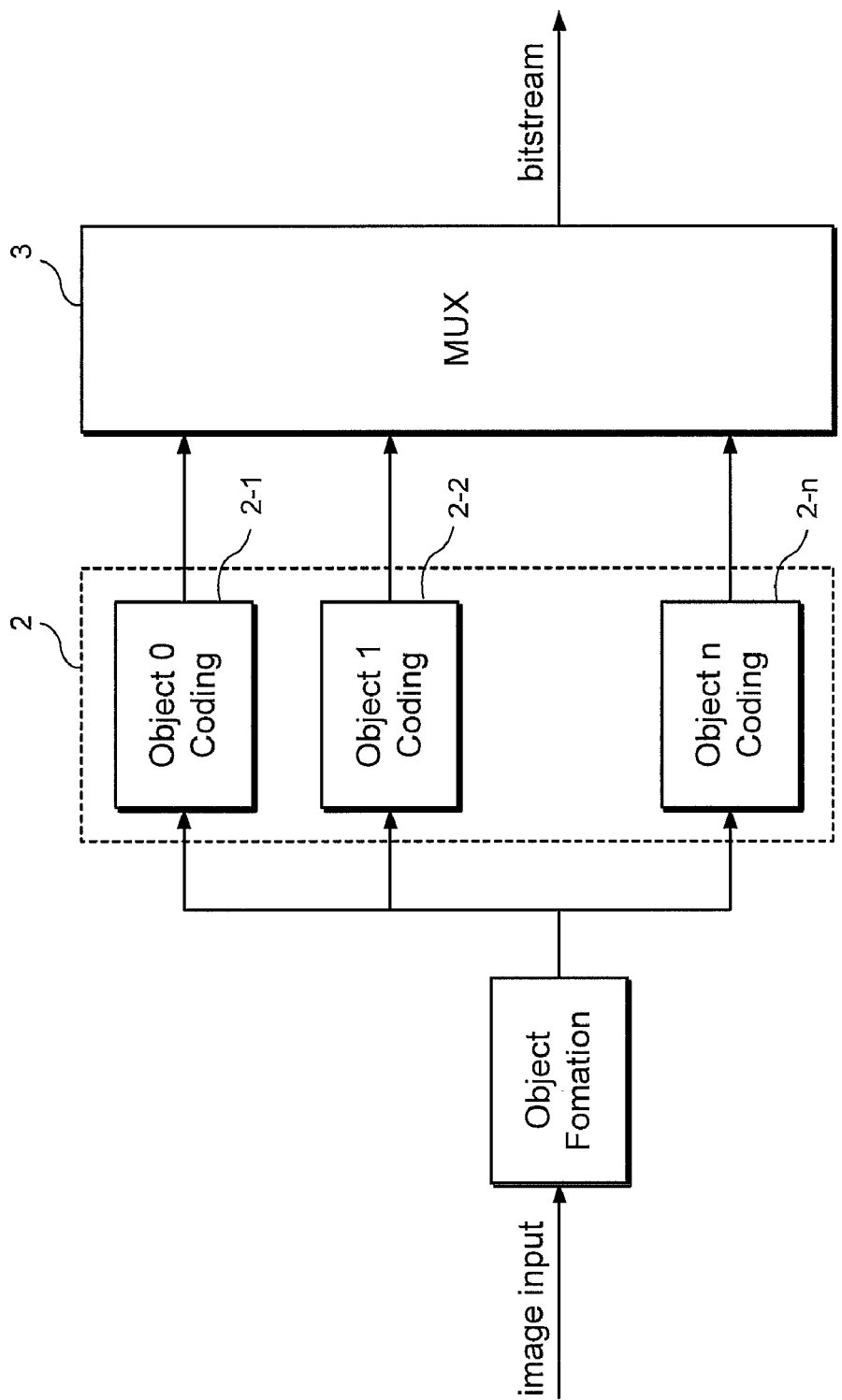
F I G. 9

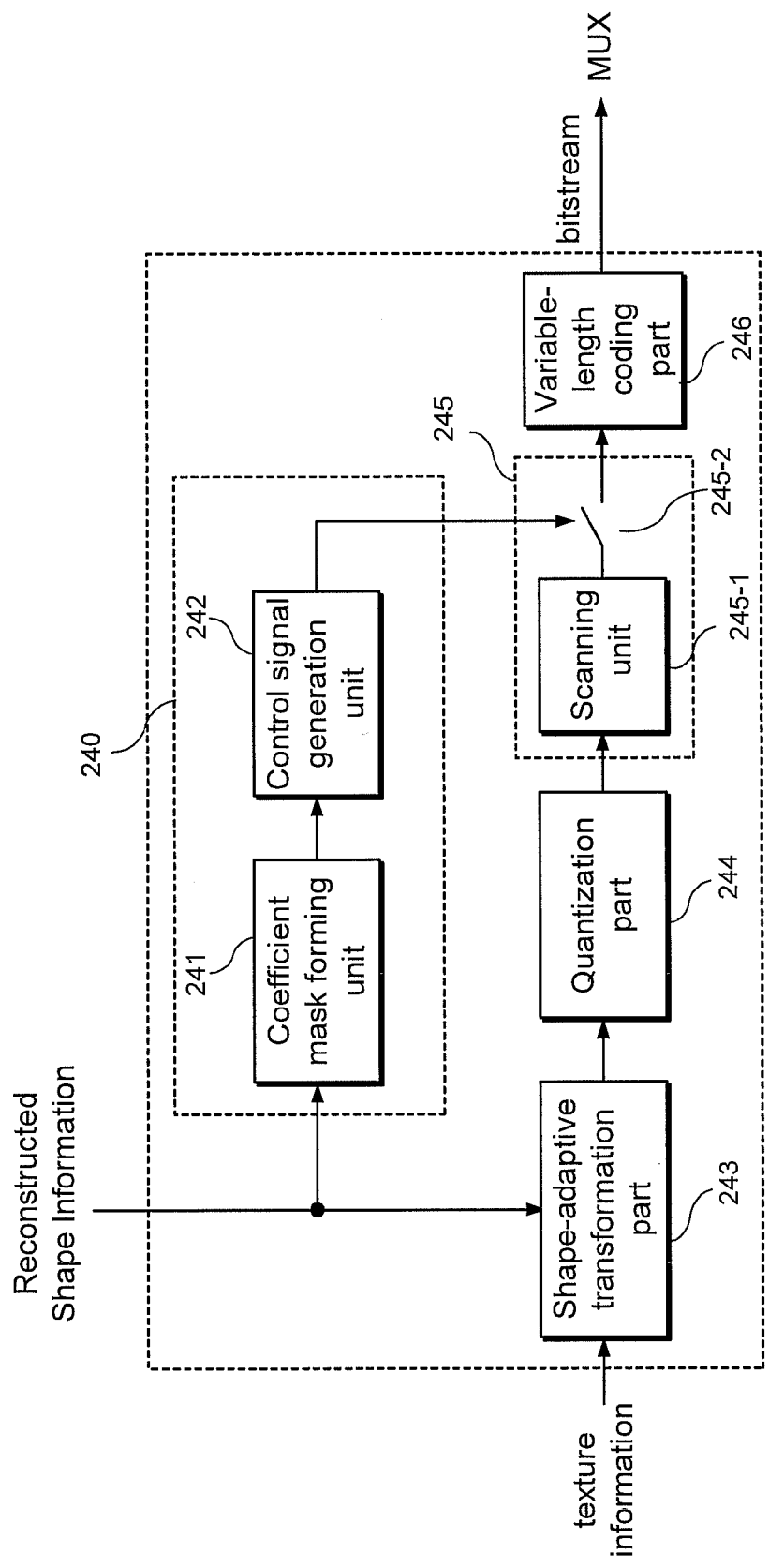
F I G. 12a

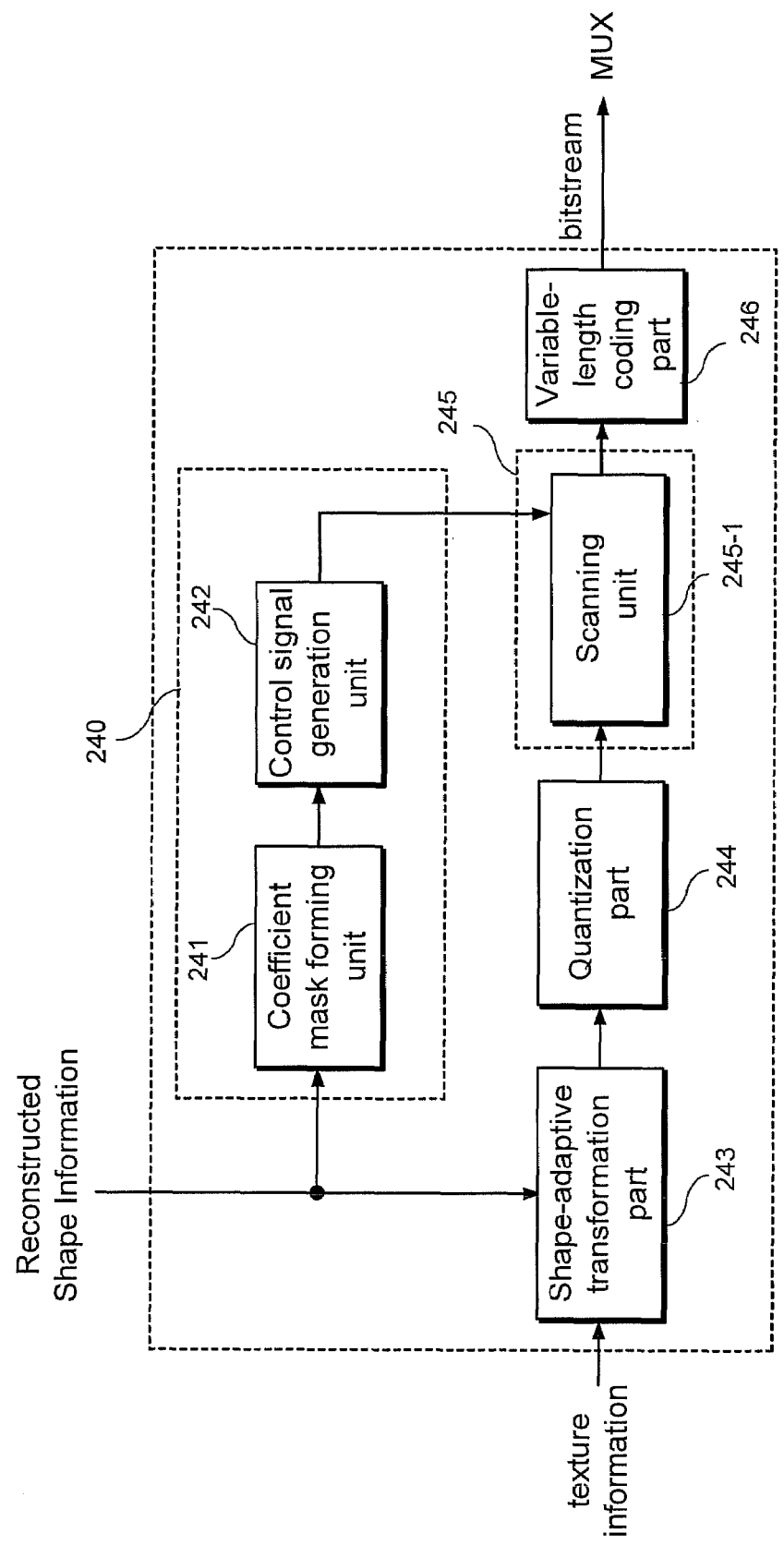
F I G. 12b

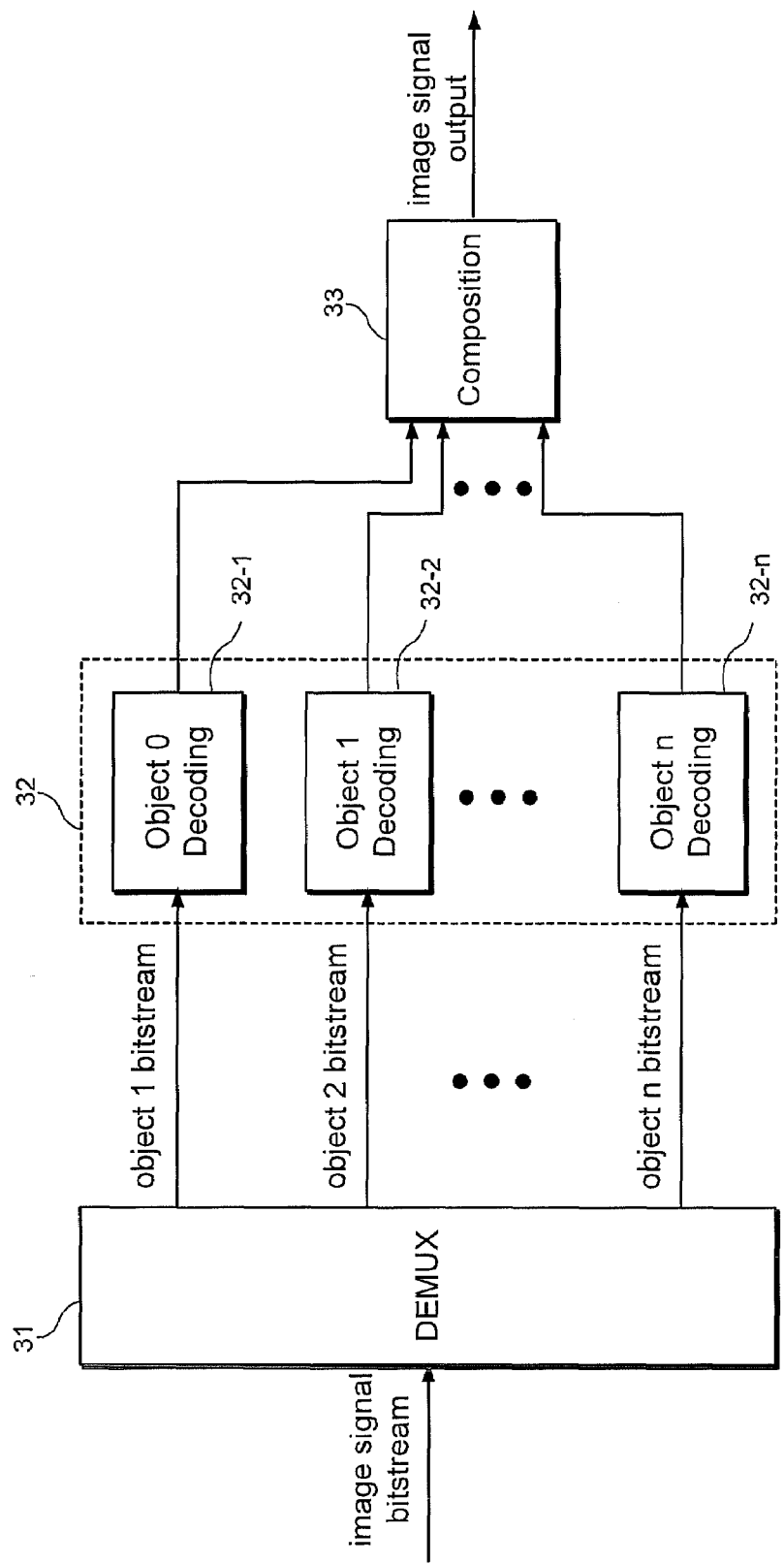
F I G. 13

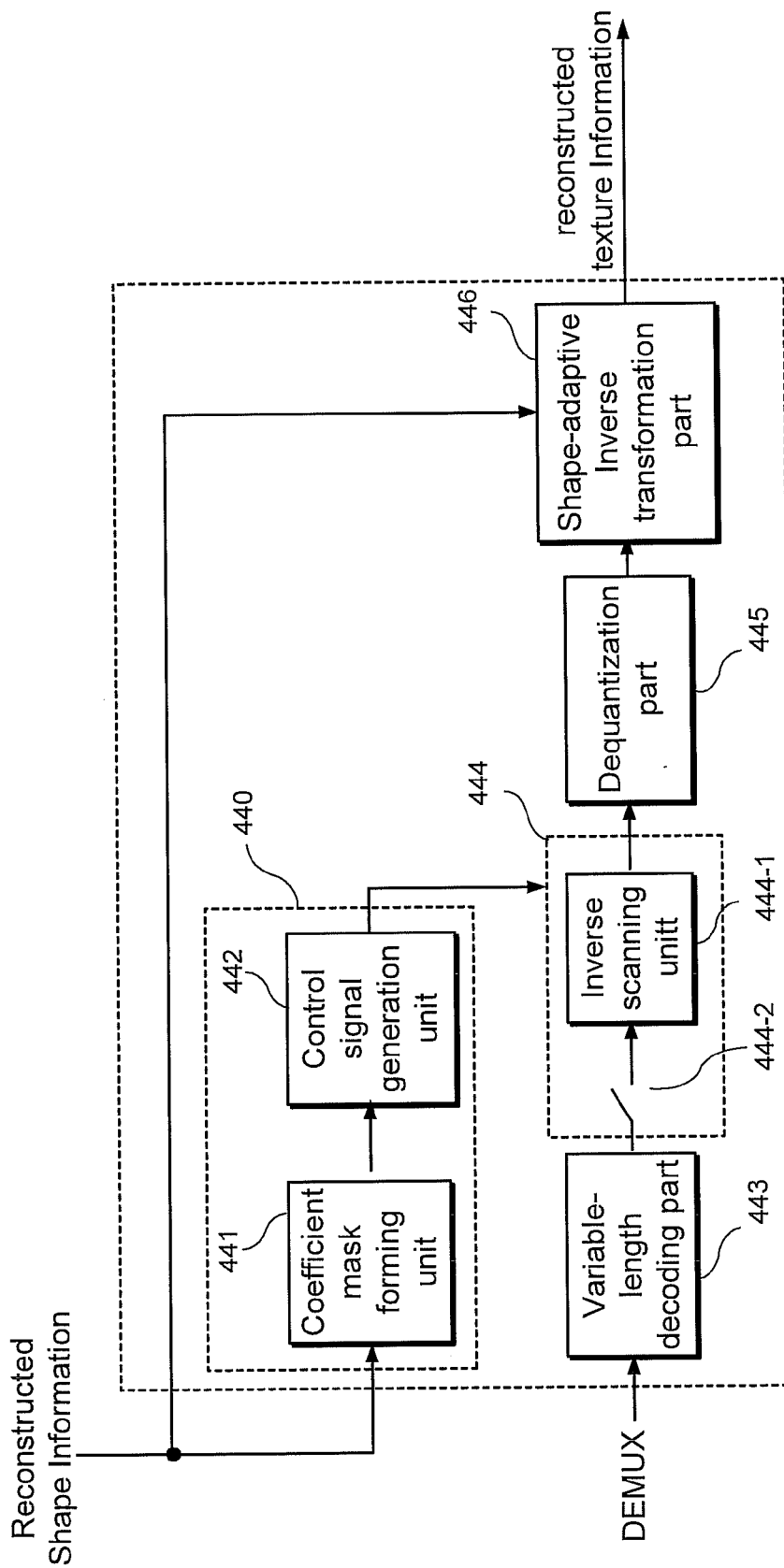
F I G. 16a

OBJECT-BASED CODING AND DECODING APPARATUSES AND METHODS FOR IMAGE SIGNALS

This application is a continuation-in-part of 08/578,142 filed on Dec. 26, 1995 now abandoned.

BACKGROUND OF THE INVENTION

1. Field of the Invention

The present invention relate to image signal compression coding and decoding, and more particularly to an apparatus for and a method of coding image signals, wherein upon scanning transform coefficients of an input image signal in a shape-adaptive transform coding, only segments containing such shape-adaptive transform coefficients are scanned, thereby reducing the quantity of data being transmitted. The present invention also relates to an apparatus for and a method of decoding image signals, wherein an inverse scanning for transform coefficients of a bitstream encoded in the above-mentioned manner is carried out upon decoding the bitstream, taking into consideration only segments containing those transform coefficients.

2. Description of the Prior Art

Compression coding and decoding of image signals makes it possible to achieve transmission of image information while reducing the memory capacity required to store image signals. Thus, such compression coding and decoding techniques are very important techniques in multimedia industries involving applications such as storage and transmission of image signals. Meanwhile, a standardization for information compression schemes has been necessary for extension of multimedia industries and information compatibility. To this end, various image standardization schemes associated with a variety of applications have been proposed. For example, as representative image coding and decoding standardization schemes, there are H.261 of International Telecommunication Union—Telecommunication Standardization Sector (ITU-T, the successor of CCITT) for video phone or video conference services using integrated services digital networks (ISDN), and H.263 of ITU-T for transmission of video information using public switched telephone networks (PSTN), MPEG-1 proposed by Moving Picture Experts Group (MPEG) of International Standardization Organization/International Electrotechnical Commission Joint Technical Committee 1/Sub Committee 29/Working Group 11 (ISO/IEC JTC1/SC29/WG11) for storage media, and MPEG-2 for high quality digital broadcasting associated with high definition televisions (HDTV) and enhanced digital television (EDTV). Standardization for compressive coding of still image signals also has been made by, for example, Joint Photographic Coding Experts Group (JPEG) of ISO/IEC JTC1/SC29/WG1.

In most conventional image signal coding schemes, the entire segment of a rectangular frame or picture is encoded. Such schemes are called "frame-based coding". In such image signal coding schemes, texture information of all pixels included in a frame, namely, luminance and chrominance, is encoded and transmitted.

Recently, the demands for multimedia products have been increased which have functions of coding or manipulating only particular regions—or object—of a frame interested or needed to the user without coding the entire region of the frame. To this end, active research has recently been conducted for object-based coding schemes adapted to encode only arbitrary shape region of a frame, as a substitute for frame-based coding schemes adapted to encode the entire region of a frame. FIGS. 1 and 2 illustrate test images for explanation of such an object-based coding scheme, respectively. FIG. 1 is a frame showing features of two children playing with a ball in an arbitrary space (background). Where information, only associated with the children and ball, of the image is to be encoded and transmitted coding of such information can be achieved using the object-based coding scheme, that is, only texture information values of pixels associated with the children and ball are encoded and transmitted. In this case, the regions respectively associated with the children and ball are designated to be an object, whereas the remaining region of the picture other than the object is considered to be a background.

For coding of the picture shown in FIG. 1 using the object-based coding scheme, all pixels included in the frame should be distinguished into those associated with the children and ball and those associated with the background in an encoder and a decoder. This information is referred as shape information of the object. In order to allow the decoder to recognize the shape information, the encoder should efficiently encode the shape information and then transmit the shape information to the decoder. For thus, the object-based encoder and decoder have a most remarkable difference from the frame-based encoder and decoder in that they include a shape information encoder and a shape information decoder, respectively.

FIG. 2 shows shape information included in the image information where only the children and ball are considered to be an object. In this case, the pixels associated with the children and ball have shape information bearing a bright value whereas the pixels associated with the background have shape information bearing a dark value. Such shape information of pixels assigned with different values to distinguish those of the pixels associated with the object from those associated with the background is called a "binary mask". Shape information may also be expressed by a contour indicative of the boundary between the background and the object. A transformation can be made between the shape information in the form of a binary mask and the shape information in the form of a contour. That is, the shape information having the form of a binary mask can be expressed into contour information by carrying out a contour extraction. On the other hand, a contour filling is carried out for obtaining a binary mask from contour information.

Representative examples of frame-based coding schemes include H.261 and H.263 of ITU-T, MPEG-1 and MPEG-2 of ISO/IEC JTC1/SC29/WG11, and JPEG of ISO/IEC JTC1/SC2 all being standardized schemes. On the other hand, representative examples of object-based coding schemes include MPEG-4 of ISO/IEC JTC1/SC29/WG11 and JEP2000 of ISO/IEC JTC1/SC29/WG11.

Transform coding is the most widely used coding method in well-known compressive coding schemes for image signals. In such a transform coding, an image signal is transformed to transform coefficients—or frequency coefficients and low frequency components are mainly transmitted while suppressing transmission of high frequency components. This scheme has an advantage of a high compression ratio while minimizing the degradation of picture quality. Examples of such a transform coding scheme include a discrete Fourier transform (DFT), a discrete cosine transform (DCT), a discrete sine transform (DST), and a Walsh-Hadamard transform (WHT).

Of such transform schemes, DCT is a scheme providing a superior compactness of image signal energy on low-frequency components. In other words, DCT provides a superior picture quality over other transform schemes, in spite of only using a reduced number of low frequency transform coefficients. In addition, there is a fast algorithm for DCT. By virtue of such an advantage, DCT has been used in various image coding standardization schemes such as H.261, H.263, MPEG-1, MPEG-2, MPEG-4, and JPEG.

Research of such transform coding schemes has been made with respect to image signals in blocks each consisting of a set of pixels (picture elements or pels) with a certain size. In accordance with transform coding schemes developed, a rectangular frame is divided into a plurality of blocks having the same size. A transform coding is then carried out for each block. In the case of an object-based coding scheme only texture information included in objects is encoded, as compared to frame-based coding scheme in which texture information of all pixels included in a rectangular frame is completely encoded. In such an object-based coding scheme, accordingly, it is required to conduct a transform coding only for image signal of some pixels of blocks associated to the object. FIG. 3 illustrates an object having an arbitrary shape in a frame divided into a plurality of blocks. In FIG. 3, each square region is indicative of one block. Dark region is indicative of a set of pixels associated with the object. In FIG. 4, transparent blocks correspond to blocks of FIG. 3 not to be encoded because of including no object pixel, respectively. The black blocks of FIG. 4 are indicative of blocks which are to be transformed by one of the known transform coding schemes because all pixels thereof are object pixels. The gray blocks of FIG. 4 are indicative of blocks each including both the object pixels and the non-object pixels, thereby requiring a transform coding only for texture information of a part of pixels thereof. In the following description, blocks corresponding to such gray blocks are referred to as "boundary blocks". This scheme, in which a transform coding is not conducted for the entire pixels of each square block, but conducted for a part of pixels included in each square block, is called a "shape-adaptive transform coding".

In a representative shape-adaptive transform coding scheme, each block which is a coding unit consists of 8×8 pixels. Namely, blocks include 8 lines per block and 8 pixels per line. In accordance with the scheme, texture signal of object pixels to be encoded are processed by an one-dimensional DCT in a vertical direction and then in a horizontal direction.

Referring to FIG. 5A, an 8×8 block is illustrated which has an object region to be encoded. In FIG. 5A, gray pixels are pixels associated with objects. For processing an shape-adaptive DCT coding for texture signal of object pixels to be encoded, a re-arrangement of pixels is carried out by vertically shifting those object pixels to the upper border of the block, thereby filling that border, as shown in FIG. 5B. In this state, one-dimensional DCT is performed in a vertical direction (indicated by thick lines in FIG. 5) for texture information of each column including object pixels. As a result, transform coefficients of one-dimensional DCT are generated, as shown in FIG. 5C. The solid circles in FIG. 5C denote positions of mean values of vertical one-dimensional DCT, namely, direct current (DC) values, respectively. After completing the vertical one-dimensional DCT as shown in FIG. 5D, a pixel re-arrangement is conducted again by shifting again the object pixels to the left border of the block. Thereafter, one-dimensional DCT is performed in a horizontal direction for the transform coefficients included in each of rows, which comprise at least one transform coefficient, as shown in FIG. 5E. FIG. 5F shows positions of transform coefficients completing the one-dimensional DCT in both the vertical and horizontal directions. This procedure, namely, the transform, in which one directional DCT is carried out in a successive manner in the vertical and horizontal directions, is called a "shape-adaptive DCT". It should be noted that the positions of transform coefficients resulting from the shape-adaptive DCT may not be coincide with those of input object pixels (or input shape information) and that the positions of those transform coefficients are determined only based on the input shape information. The number of transform coefficients resulting from the shape-adaptive DCT is equal to the number of object pixels, as in the conventional block-wised DCT schemes.

FIG. 6 illustrates a block diagram of a conventional shape-adaptive image signal coding apparatus (=texture information encoding part 24) which utilizes the above mentioned shape-adaptive DCT. This apparatus 24 receives, as an input thereof, shape information on a block basis having a M×N size (M and N are integer values larger than zero) and texture information of object pixels in the form of a block having the same size as the shape information block. In the case of FIGS. 5A to 5F, block of M=8 and N=8 is inputted. The apparatus 24 generates an output in the form of a bitstream. The outputted bitstream is transmitted to a receiver. Otherwise, the bitstream may be transmitted to a multiplexer (MUX) so that it is multiplexed with other signals, for example, bitstreams of shape information.

An shape-adaptive DCT part 10 first performs a shape-adaptive DCT for input texture information of object pixels, based on input shape information, thereby outputting transform coefficients which are positioned at the upper left portion of an associated block, as shown in FIG. 5F. For these transform coefficients, a quantization is conducted for data compression in a quantization part 11. As a result, quantized transform coefficients are outputted from the quantization part 11. The transform coefficients from the quantization part 11 are then transmitted to a scanning part 12 which, in turn, carries out a scanning procedure for arranging the received transform coefficients into a one-dimensional array. Various scanning methods applicable to blocks of M=8 and N=8 are illustrated in FIGS. 7A to 7C. FIG. 7A illustrates a zig-zag scanning order most widely used. In FIG. 7A, the numerals indicated on respective portions of the block are indicative of the scanning order of corresponding transform coefficients upon arranging those transform coefficients in a one-dimensional array. The scanning methods of FIGS. 7A to 7C can be selectively used in accordance with the characteristics of input image signals to be subjected to a transform coding. These scanning methods are also used in MPEG-2 and MPEG-4 schemes. Blocks, which are processed by the shape-adaptive DCT, may include segments containing no transform coefficient, as shown in FIG. 5F. In accordance with a conventional schemes, a scanning operation is carried out for the entire segment of a block in a sequential manner according to a well-known, predetermined scanning order while setting transform coefficient values of segments containing no transform coefficient to "zero". That is, all segments—64 transform coefficients in the case of an 8×8 block—are sequentially scanned using one of the known scanning methods, irrespective of whether or not the segments to be scanned contain transform coefficients. The resultant transform coefficients arranged in a one-dimensional array are subjected to a variable-length coding in a variable-length coding part 13. The resultant signal in the form of a bitstream is then transmitted to an MUX or receiver.

The variable-length coding part 13 receives, as an input thereof, the DCT coefficients outputted from the scanning part 12 and carries out a variable-length coding for the transform coefficients arranged in a one-dimensional array in a sequential manner.

Now, the variable-length coding for transform coefficients will be described in conjunction with H. 263 which is a representative of conventional variable-length coding schemes. In accordance with this scheme, EVENTs of transform coefficients with values not being "zero" are first derived. For the derive EVENTs, corresponding bitstreams are then sought from a given variable-length coding (VLC) table. Thereafter, the sought codes are sequentially outputted. Each EVENT consists of a combination of three kinds of information, namely, a LAST indicative of whether or not the transform coefficient being currently encoded is the last non-zero transform coefficient, a RUN indicative of the number of successive zero transform coefficients preceding the current non-zero coefficient and a LEVEL indicative of the magnitude of the current transform coefficient.

Such EVENTs, which are combined and defined as mentioned above, can be entropy-coded through a variable-length coding such as Huffman coding or arithmetic coding. This is, a smaller amount of bits are allocated for EVENTs exhibiting a higher occurrence probability. On the other hand, a larger amount of bits are allocated for EVENTs exhibiting a lower occurrence probability. Accordingly, it is possible to achieve coding of EVENTs using a considerably reduced number of bits, as compared to a fixed-length coding (FLC).

A part of a VLC table that used for H.263, is illustrated in Table 1.

| INDEX | LAST | RUN | LEVEL | BIT | VLC CODE |
|---|---|---|---|---|---|
| 0 | 0 | 0 | 1 | 3 | 10s |
| 1 | 0 | 0 | 2 | 5 | 1111s |
| 2 | 0 | 0 | 3 | 7 | 0101 01s |
| 3 | 0 | 0 | 4 | 8 | 0010 111s |
| 4 | 0 | 0 | 5 | 9 | 0001 1111s |
| 5 | 0 | 0 | 6 | 10 | 0001 00101s |
| 6 | 0 | 0 | 7 | 10 | 0001 0010 0s |
| 7 | 0 | 0 | 8 | 11 | 0000 1000 01s |
| 8 | 0 | 0 | 9 | 11 | 0000 1000 00s |
| 9 | 0 | 0 | 10 | 12 | 0000 0000 111s |
| 10 | 0 | 0 | 11 | 12 | 0000 0000 110s |
| 11 | 0 | 0 | 12 | 12 | 0000 0100 000s |
| 12 | 0 | 1 | 1 | 4 | 110s |
| 13 | 0 | 1 | 2 | 7 | 0101 00s |
| 14 | 0 | 1 | 3 | 9 | 0001 1110s |
| 15 | 0 | 1 | 4 | 11 | 0000 0011 11s |
| 16 | 0 | 1 | 5 | 12 | 0000 0100 001s |
| 17 | 0 | 1 | 6 | 13 | 0000 0101 0000s |
| 18 | 0 | 2 | 1 | 5 | 1110s |
| 19 | 0 | 2 | 2 | 9 | 0001 1101s |
| 20 | 0 | 2 | 3 | 11 | 0000 0011 10s |
| 21 | 0 | 2 | 4 | 13 | 0000 0101 0001s |
| 22 | 0 | 3 | 1 | 6 | 0110 1s |
| 23 | 0 | 3 | 2 | 10 | 0001 0001 1s |
| 24 | 0 | 3 | 3 | 11 | 0000 0011 01s |

In the Table 1, the first column represents indexes for distinguishing EVENTs from one another. The second column represents LASTs. LAST=0 denotes that coefficient to be coded is not the last non-zero transform coefficient whereas LAST=1 denotes that the coefficient is the last one. The third column represents RUNs. The fourth column represents LEVELs indicative of values of transform coefficients. The fifth column represents the number of bits generated for each EVENT. The last column represents a bitstream generated for each EVENT. In the last column, "s" is indicative of the sign of each LEVEL. A s of "0" (s=0) is indicative of the fact that the associated LEVEL is a positive number whereas a s of "1" (s=1) is indicative of the fact that the associated LEVEL is a negative number.

With regard to the occurrence probability of EVENTs, it should be noted that EVENTs exhibit a lower occurrence probability at greater RUN values and a higher occurrence probability at smaller RUN values. Where the variable-length coding is conducted, taking RUNs into consideration, accordingly, a larger amount of bits are allocated for an EVENT with a greater RUN value whereas a smaller amount of bits are allocated for an EVENT with a smaller RUN value. Referring to the VLC table of H.263 as shown in Table 1, such a feature can be clearly understood. This will be exemplarily described in conjunction with EVENTs (INDEX=1, 13, 19) respectively having RUNs of 0, 1, 2, along with LAST=0 and LEVEL=2. For the EVENT bearing INDEX=19 (LAST=0, RUN=2, and LEVEL=2), nine bits are allocated. Seven bits are allocated for the EVENT bearing INDEX=13 (LAST=0, RUN=1, and LEVEL=2). On the other hand, five bits are allocated for the EVENT bearing INDEX=1 (LAST=0, RUN=0, and LEVEL=2). Thus, a larger amount of bits are allocated at a greater RUN value under the condition in which the LAST and LEVEL values are fixed.

Known shape-adaptive DCT coding schemes may use the above mentioned transform coefficient VLC method or VLC table. This will be exemplarily described in conjunction with FIGS. 8A to 8E. FIG. 8A shows the result obtained after carrying out a shape-adaptive DCT and quantization for an image signal in the form of an 8×8 block. In FIG. 8A, the dark segments correspond to object pixels of the block, respectively. Accordingly, the dark segments correspond to segments containing transform coefficients generated due to the object pixels. The remaining bright segments are indicative of segments containing no transform coefficient, thereby being set with a transform coefficient value of "0". In each dark segment, "Xij" represents a transform coefficient positioned at an i-th position in a horizontal direction and a j-th position in a vertical direction in 8×8 block. When all transform coefficients of the block are scanned in a zig-zag scanning order, they are arranged in the order of X11, X12, X21, X31, X22, X13, X14, 0, X32, X41, X51, X42, 0, 0, X15, X16, 0, 0, 0, X52, X61, X71, 0, 0, . . . , and 0. If the transform coefficient X71 is not zero, then the variable-length coding can be carried out only for segments positioned within the region defined by the thick solid line of FIG. 8B. FIG. 8C illustrates the case in which two transform coefficients X32 and X42 are zero whereas the remaining transform coefficients having non-zero values, respectively. When the transform coefficient X41 is encoded in this case, its LAST value is zero because it is not the last one of non-zero transform coefficients in the block. In this case, LEVEL and RUN values are X41 and 2, respectively. With regard to the transform coefficient X41, such an increase in RUN value caused by the transform coefficient X32 having a value of zero is reasonable because the zero value of the transform coefficient X32 is generated in accordance with a signal information of associated object. However, the transform coefficient value of zero existing between the transform coefficients X14 and X32 is a value not generated in accordance with the object information transform, but given for a segment containing no transform coefficient. Accordingly, transmission of such information is unnecessary and rather results in an increase in RUN value. As a result, there is a disadvantage in that an increased number of bits is generated. This causes a reduction of the coding efficiency of the shape-adaptive DCT coding.

Although problems involved in the conventional shape-adaptive DCT coding, which is a representative shape-adaptive transform coding scheme, have been described, other shape-adaptive transform coding schemes also have the same problems. That is, the conventional shape-adaptive transform coding schemes have a problem in that an addition of unnecessary values of zero is involved in the scanning procedure.

Meanwhile, a variety of VLC coding schemes for carrying out a VLC for transform coefficients have been used. Although the VLC table of H.263 has been exemplified in the above description, a VLC table consisting of a combination of only RUN and LEVEL is used in the cases of JPEG, MPEG-1, and MPEG-2. In this case, however, the above mentioned problem namely, reduction of coding efficiency, also occurs because an increase in RUN value results in an increase in the number of coding bits occurs.

SUMMARY OF THE INVENTION

Therefore, an object of the invention is to overcome the above mentioned problems and to provide an object-based coding apparatus and method for image signals, wherein upon scanning shape-adaptive transform coefficients of an input image signal transformed in accordance with a shape-adaptive transform for an object-based coding thereof, only segments containing such shape-adaptive transform coefficients are scanned, thereby reducing the quantity of data being encoded.

Another object of the invention is to provide an object-based decoding apparatus and method for image signals capable of effectively decoding image data transmitted after being encoded in accordance with a coding method of the present invention.

BRIEF DESCRIPTION OF THE DRAWINGS

Other objects and aspects of the invention will become apparent from the following description of embodiments with reference to the accompanying drawings in which:

FIGS. 7A to 7C are schematic views for explanation of scanning methods to which the present invention is applicable, respectively;

FIGS. 8A to 8E are schematic views for explanation of a VLC method for quantized transform coefficients, respectively;

FIG. 9 is a block diagram illustrating an object-based image signal encoder according to the present invention;

FIGS. 12A and 12B are block diagrams respectively illustrating different embodiments of a shape-adaptive scanning part according to the present invention;

FIG. 13 is a block diagram illustrating an object-based image signal decoder according to the present invention;

FIGS. 16A and 16B are block diagrams respectively illustrating different embodiments of a shape-adaptive inverse scanning part according to the present invention.

DESCRIPTION OF THE PREFERRED EMBODIMENTS

Figure 10:
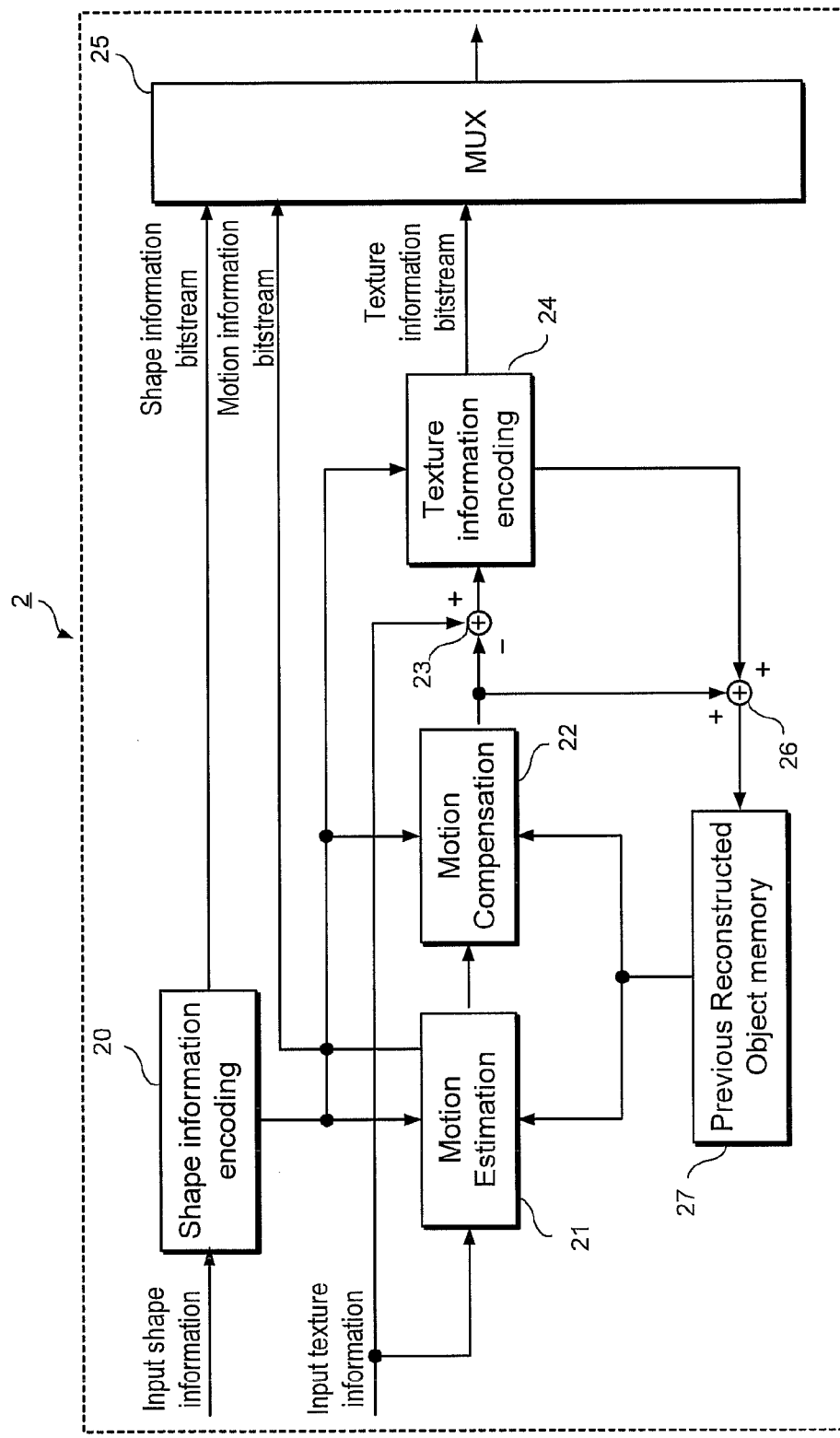
FIG. 10 is a block diagram illustrating an object coding unit according to the present invention.
Figure 11:
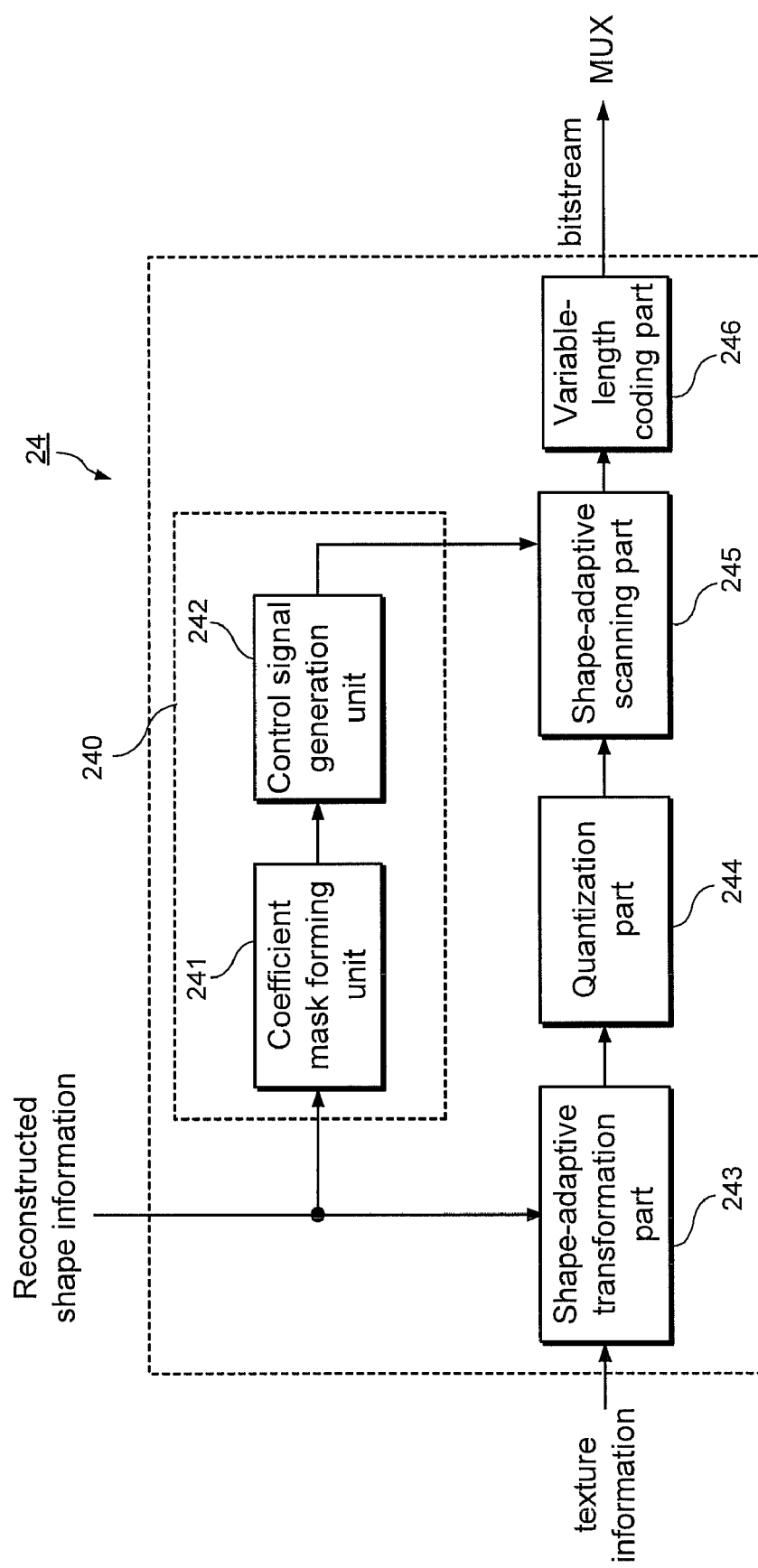
FIG. 11 is a block diagram illustrating an object-based coding of image signals in accordance with the present invention.

FIGS. 9 to 11 illustrate respective object-based image signal coding systems to which the present invention is applicable. FIG. 9 is a block diagram illustrating a general object-based image signal coding system. This system is adapted to divide an input image signal into object each having arbitrary shape information and to carry out a coding operation for each of the object. An input image signal is first applied to an object formation part 1 included in the objected-based image signal encoder. In the object formation part 1, the input image signal is divided into each object. The object formation part 1, then derives shape information and texture information for each object. The resultant signals for each object are applied to an object coding part 2 which, in turn, conducts a coding operation for those signals. This coding operation of the object coding part 2 is sequentially carried out for all objects (2-1, 2-2, . . . , and 2-n). Outputs resulting from the object coding for all objects, namely, bitstreams are then multiplexed in a multiplexer (MUX) which, in turn, sends the resultant signal to a receiver or storage media.

FIG. 10 illustrates the configuration of an object coding unit included in the object coding part 2 of FIG. 9. Although the object coding part 2 is shown in FIG. 9 as consisting of a plurality of object coding units, it practically includes a single object coding unit which repeatedly performs a coding operation by n times (2-1, 2-2, . . . , and 2-n) for n objects. Signal information of each object, which is inputted at the object coding unit, are divided into shape information and texture information. These shape information and texture information are first inputted in a shape information coding part 20 and a motion estimation part 21, respectively.

The shape information coding part 20 serves to encode the shape information of the associated object. The resultant reconstructed shape information is then applied to a motion estimation part 21, motion compensation part 22 and a texture information coding part 24. Thus, the operation of each part is carried out on an object basis. Meanwhile, a shape information bitstream, which is another output from the shape information coding part 20, is inputted to a multiplexer 25.

The reconstructed shape information controls motion estimation, motion compensation, texture information coding. In order to control a decoding apparatus in the same way as above, the reconstructed shape information of an encoder should be coincide with a reconstructed shape information in the form of shape information bitstreams received by the decoding apparatus. On the other hand, in case that lossless coding is carried out in the shape information coding part, the reconstructed shape information is identical with the input shape information. In case of lossy coding, the reconstructed shape information is different from the input shape information. Therefore, controlling process for object-based coding of image signal is performed by using not the input shape information but the reconstructed shape information. The shape information disclosed hereinafter is reconstructed shape information unless otherwise noted.

The motion estimation part 21 serves to estimate motion information of the texture information of the current object using the texture information of the current object and the texture information of the previous object stored in a previous reconstructed object information memory 27. The motion information is input to the motion compensation part 22 for a motion compensated prediction. The estimated motion information is efficiently encoded and then the resultant motion information bitstream is input to the multiplexer 25. The motion compensation part 22 carries out a motion compensated prediction using the motion information derived by the motion estimation part 21 and the previous reconstructed object texture information stored in the previous reconstructed object information memory 27.

A subtractor 23 calculates a prediction error, namely, a difference between the input texture information and the motion compensated prediction texture information derived by the motion compensation part 22. The resultant signal from the subtractor 23 is encoded in the texture information coding part 24. The resultant texture information bitstream from the texture information coding part 24 is applied to the multiplexer 25 and the reconstructed prediction error signal is applied to an adder 26. This adder 26 adds the reconstructed error signal to the motion compensated prediction signal, thereby generating a reconstructed texture information signal of an associated object. This reconstructed texture information signal is stored in the previous reconstructed object information memory 27 so that it is used for coding of an object to be subsequently inputted.

Using the reconstructed shape information received from the shape information coding part 20, the texture information coding part 24 encodes the texture information of an associated object. In the texture information coding part 24, the coding operation is not carried out for entire object, but carried out on a block basis which is pixel set having a certain size, for example, a M×N size.

Meanwhile, although the texture information coding part of FIG. 10 is illustrated as being adapted to encode prediction error signals, it may be possible to encode input texture information in place of such prediction error signals. In this regard, it is possible to achieve an improvement in coding efficiency by adaptively encoding a selected signal enabling more efficient coding thereof out of the prediction error signal and texture information signal. For example, where motion information estimation is inaccurately carried out, the resultant prediction error signal has an increased value. In this case, accordingly, it is preferred that the input texture information be encoded, because a smaller number of bits are generated. Where coding of input texture information is carried out, it is unnecessary to use an adder operation for adding the reconstructed texture information to the prediction signal. Therefore, the coding part generally includes a control unit for determining a suitable mode and carrying out a control based on the determined mode, even though not shown in FIG. 10.

FIG. 11 illustrates an apparatus for object-based coding of image signals in accordance with the present invention. This apparatus corresponds to the texture information coding part (24) of FIG. 10. As shown in FIG. 11, the object-based coding apparatus for image signals according to the invention comprises:

a shape information coding part for encoding shape information of an input image signal;

a shape-adaptive transform part for carrying out a shape-adaptive transform for texture information of said input image signal, based on said shape information outputted from said shape information coding part;

a shape-adaptive scan control part for forming a binary coefficient mask having the same transform coefficient distribution as that of an output signal from said shape-adaptive transform part, and generating a scan control signal in accordance with existence or nonexistence of a transform coefficient based on said binary coefficient mask; and a shape-adaptive scanning part for carrying out a scanning operation for an output from said shape-adaptive transform part, based on the associated control signal from said shape-adaptive scan control part.

The shape-adaptive scan control part 240 of the object-based coding apparatus comprises:

a coefficient forming unit 241 adapted to form a binary coefficient mask for sorting segments containing transform coefficients from segments containing no transform coefficient which has the same transform coefficient distribution as that of an output signal from said shape-adaptive transform part; and a control signal generation unit 242 adapted to generate a skip signal for skipping segments containing no transform coefficient from the scanning operation of said shape-adaptive scanning part.

The shape-adaptive scan control part 240 receives reconstructed shape information from the shape information coding part 20 of FIG. 10, thereby generating a control signal for sorting segments containing transform coefficients from segments containing no transform coefficient so as to control a scanning operation in such a manner that the segments containing transform coefficients are scanned in a scan order while the segments containing no transform coefficient are excluded from the scan order.

The coefficient forming unit 241 is adapted to transform the input reconstructed shape information in the same manner as in a shape-adaptive transform coding, thereby forming a coefficient mask which denotes a region of segments having a transform coefficient (transform coefficient region) so as to sort segments containing transform coefficients from segments containing no transform coefficient. The scan control signal generation unit 242 serves to scan the coefficient mask in the same manner as in the scanning of transform coefficients and to generate a signal indicative of whether or not the currently scanned mask corresponds to the transform coefficient region.

The apparatus further includes a shape-adaptive scanning part 245 which scans quantized coefficients contained in the segments containing transform coefficients while excluding the segments containing no transform coefficient, thereby skipping them, in response to the control signal generated from the shape-adaptive scan control part 240.

The shape-adaptive scanning part (245) according to the present invention also receives transform coefficients outputted from a shape-adaptive transform unit (243) and conducts a scanning operation for arranging those transform coefficients in a one-dimensional array. During the scanning operation, the shape-adaptive scanning part receives a control signal—a signal indicative of whether or not the currently scanned segment contains an associated transform coefficient—from the shape-adaptive scan control unit, in order to exclude segments containing no transform coefficient from the scan order, namely, to prevent zero coefficients of those segments from being included in the one-dimensional array.

In other embodiment of the present invention, the shape-adaptive scanning part 245 comprises:

a scanning unit 245-1 adapted to scan the entire segment including segments containing shape-adaptive transform coefficients and segments containing no transform coefficient, but respectively filled with coefficients of a predetermined value; and a switching unit 245-2 adapted to receive an output signal from said scanning unit and to switch off said output signal from said scanning unit, based on said skip signal from said control signal generation unit, when said output signal is associated with a segment containing no transform coefficient.

In accordance with the present invention, therefore, it is possible to reduce the number of zero coefficients unnecessarily inserted irrespective of non-existence of transform coefficients in the case of the conventional scanning methods. This results in an advantage of an improvement in coding efficiency.

Figure 1:
FIG. 1 is a view illustrating a test image for explanation of an object-based coding scheme.
Figure 2:
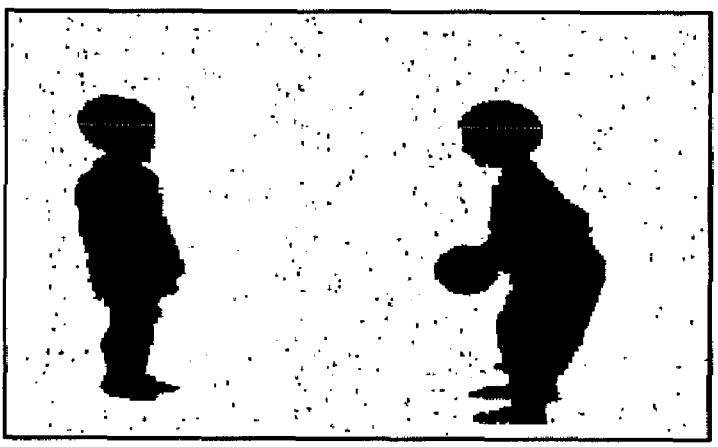
FIG. 2 is a view illustrating the shape information of the test image shown in FIG. 1.
Figure 3:
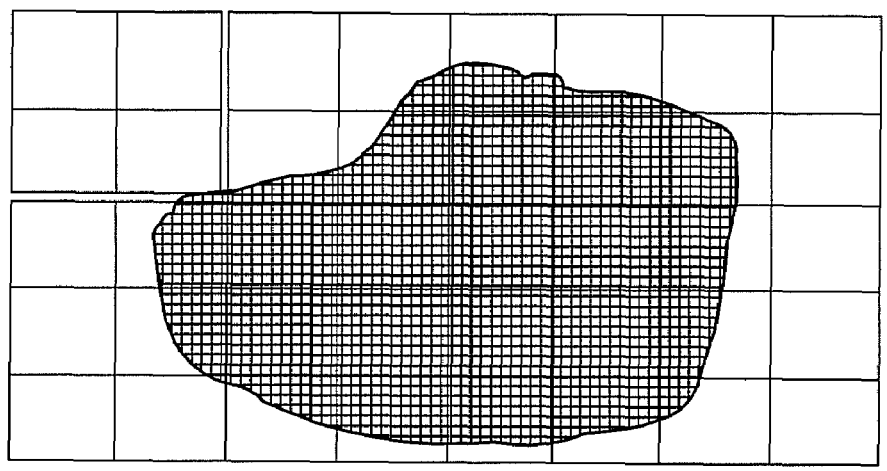
FIG. 3 is a schematic view illustrating object blocks for a shape-adaptive transform coding.
Figure 4:
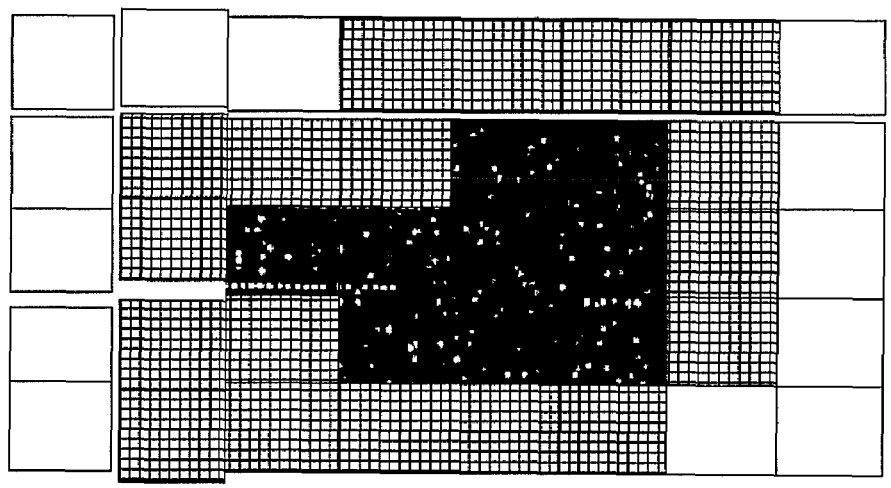
FIG. 4 is a schematic view for explanation of the shape-adaptive transform coding for each block of FIG. 3.
Figure 5:
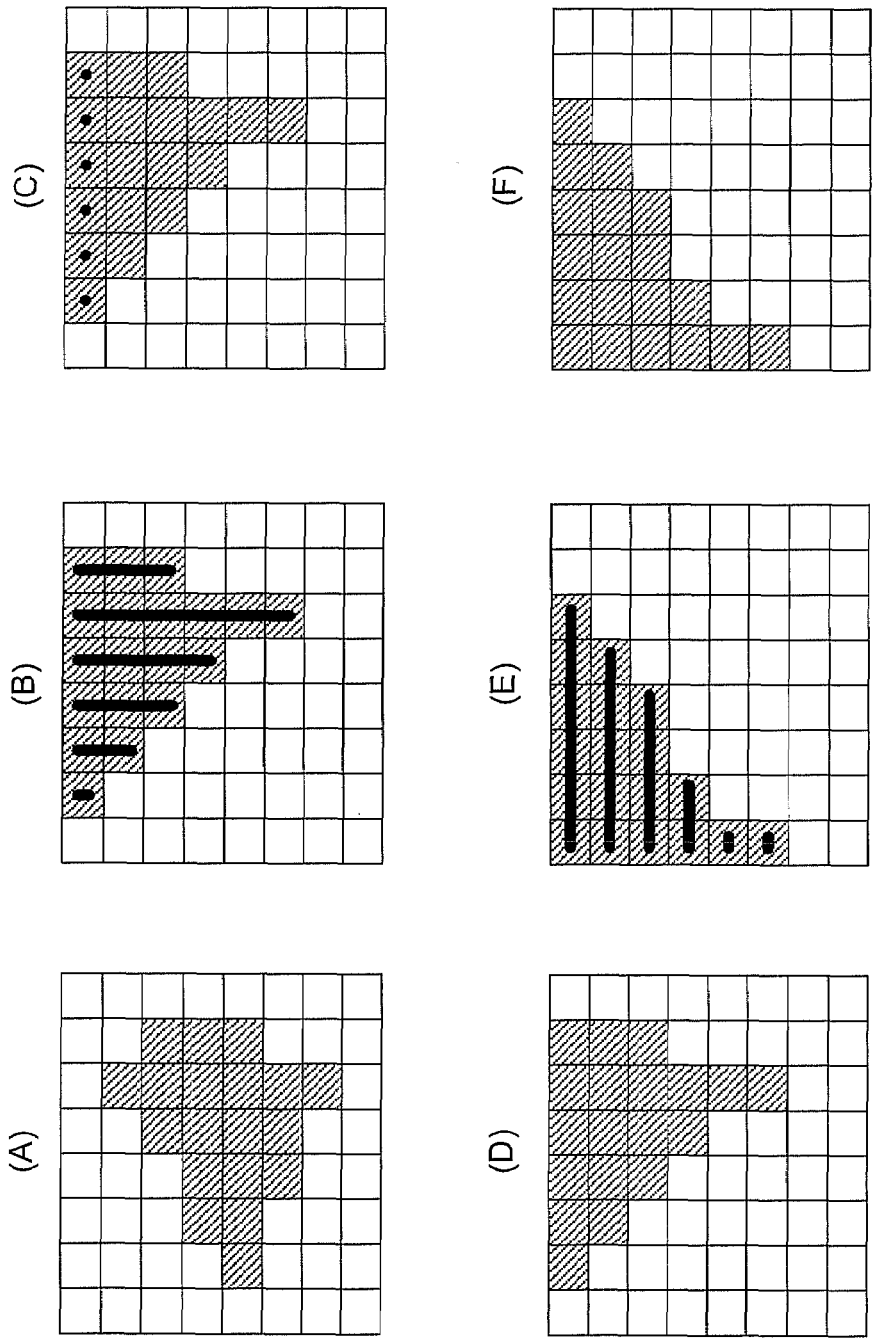
FIGS. 5A to 5F are schematic views respectively illustrating successive steps involved in a general shape-adaptive DCT procedure.
Figure 6:
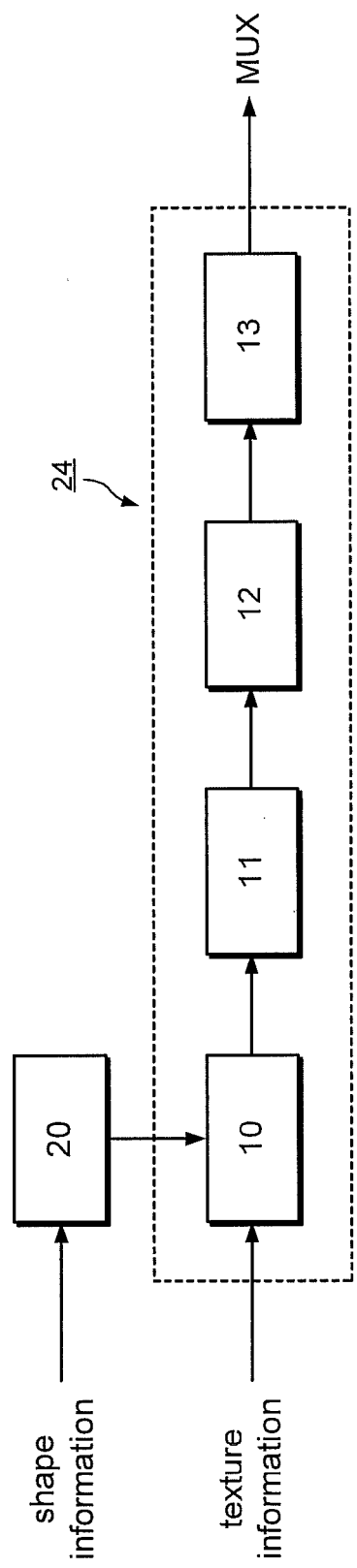
FIG. 6 is a block diagram illustrating a conventional shape-adaptive image signal coding apparatus.

Now, the operation of the object-based image signal coding apparatus of FIG. 11 according to the present invention, which corresponds to the texture information coding part 24 of FIG. 10, will be described in detail. When a boundary block as shown in FIG. 4 is inputted at the input stage of a shape-adaptive transform unit 243, it is processed by the well-known shape-adaptive transform, so that the shape-adaptive transform unit 243 outputs shape-adaptive transform coefficients. In this case, the texture information signal inputted at the shape-adaptive transform unit 243 may be a prediction error signal as used in the case of FIG. 10. Alternatively, an input texture information signal may be inputted where the prediction error signal has a large value. Such an input mode selection has no direct relation with the present invention. The shape-adaptive transform unit 243 also receives reconstructed shape information outputted from the shape information coding part 20 of FIG. 10 in order to determine which pixels correspond to object pixels. The number of transform coefficients outputted from the shape-adaptive transform unit 243 is equal to the number of object pixels. Where the transform coding used is the shape-adaptive DCT, the transform coefficients are arranged in a manner as described in conjunction with FIG. 5. Referring to this example, it can be found that the transform coefficients outputted from the shape-adaptive transform unit 243 have a different arrangement from the shape information inputted at the same unit 243. Accordingly, it is necessary to change the arrangement of the input shape information so that it is identical to that of the transform coefficients. This arrangement change is carried out in the coefficient mask forming unit 241. This will be described in more detail. The input of the coefficient mask forming unit 241 is the input shape information whereas the output of the same unit 241 is shape information having an arrangement identical to the arrangement of the transform coefficients outputted from the shape-adaptive transform unit 243. That is, the coefficient mask forming unit 241 forms a coefficient mask for determining whether or not the currently scanned segment contains an associated transform coefficient. The coefficient mask output from the coefficient mask forming unit 241 is applied to the scan control signal generation unit 242 via an output stage thereof. Based on such shape information, the scan control signal generation unit 242 controls the shape-adaptive scanning part 245.

The transform coefficients from the shape-adaptive transform unit 243 are applied to a quantization part 244 which, in turn, carries out a quantization for the received transform coefficients. The quantized transform coefficients are transmitted to the shape-adaptive scanning part 245 which, in turn, arranges the received transform coefficients in a one-dimensional array. The transform coefficients arranged in a one-dimensional array are applied to a variable-length coding part (VLC) 246 which, in turn, conducts a coding operation for the received transform coefficients, thereby outputting an associated bit stream. In the case of the well-known scanning methods, a transform coefficient scanning operation is performed for the entire segment of a block, as shown in FIGS. 7A to 7C. In the shape-adaptive transform, however, only the transform coefficients respectively associated with pixels included in the object region are transmitted. In this case, the arrangement of the transform coefficients outputted from the shape-adaptive transform unit 243 or quantization part 244 is changed depending on the shape information. Accordingly, the control signal generation unit 242 generates a signal indicative of whether or not the currently scanned mask region corresponds to the transform coefficient region, based on the shape information outputted from the coefficient mask forming unit 241, while conducting its scanning operation in the same manner as in the shape-adaptive scanning part 245, based on the shape information outputted from the coefficient mask forming unit 241. As mentioned hereinbefore, the shape information outputted from the coefficient mask forming unit 241 has the same arrangement as that of the transform coefficients outputted from the shape-adaptive transform unit 243. Therefore, the scan control, which is carried out based on such shape information, makes it possible to effectively eliminate unnecessary information possibly generated in the shape-adaptive transform coding. Thus, there is an advantage of an improvement in coding efficiency.

Figure 8:
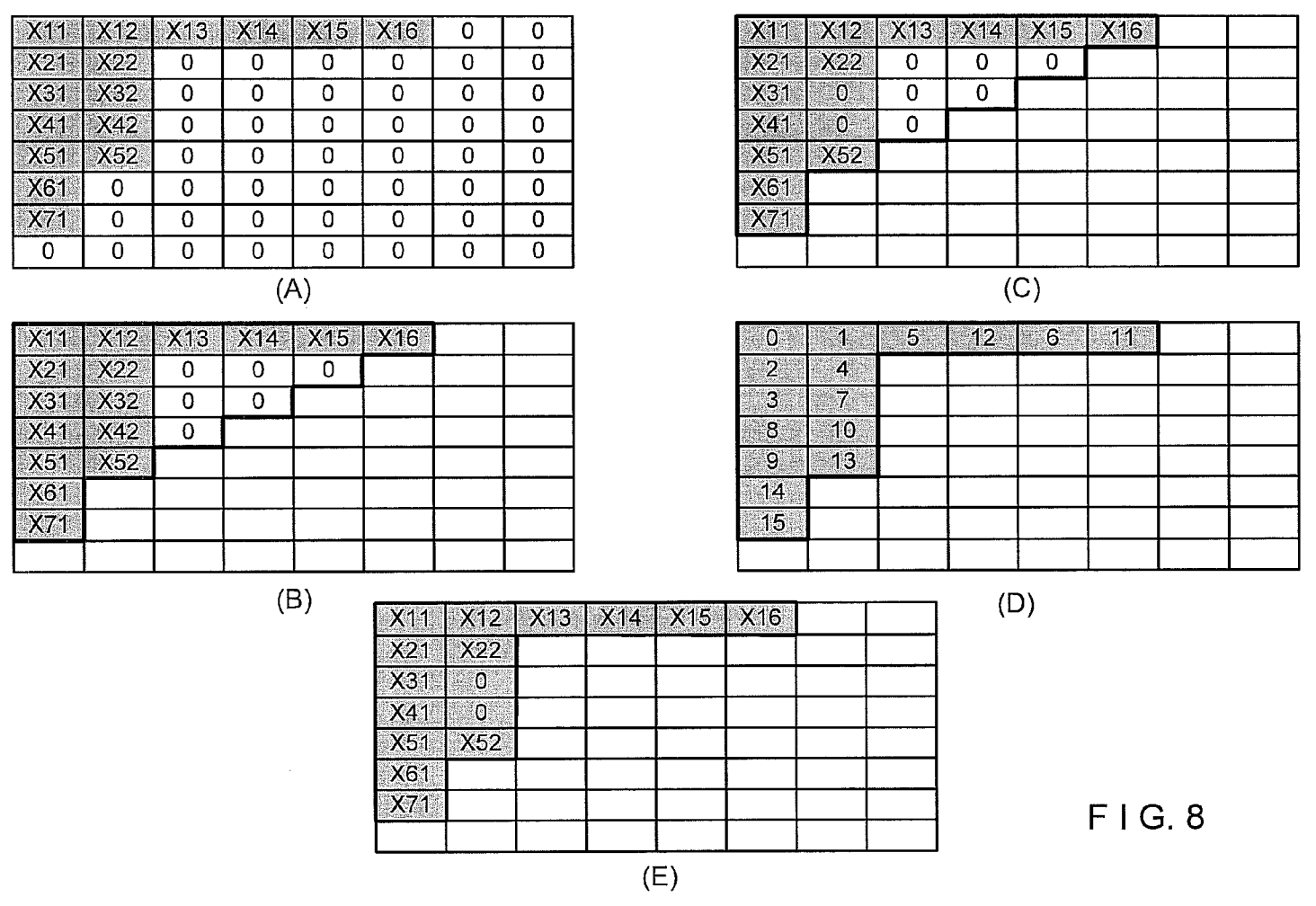

FIGS. 12A and 12B illustrate embodiments of the shape-adaptive scanning part 245 according to the present invention, respectively. In the case of FIG. 12A, the shape-adaptive scanning part 245 includes a scanning unit 245-1 and a switching unit 245-2. The shape-adaptive scanning unit 245-1 is configured to operate in the same scanning manner as in the conventional scanning method of FIGS. 7A to 7C. The switching unit 245-2 serves to carry out its switching operation in accordance with a control signal received from the shape-adaptive scan control unit 245-1. Where the control signal applied to the switching unit 245-2 is indicative of a segment containing no transform coefficient, the switching unit 245-2 is switched off. The switching unit 245-2 is also switched on when the control signal applied thereto is indicative of a segment containing a transform coefficient. In accordance with such an operation of the switch controlled in response to the control signal, the shape-adaptive scanning part generates its output only for segments containing transform coefficients. This will be described in more detail in conjunction with FIG. 8C. Assuming that the scanning method used is a zig-zag scanning method, the shape-adaptive scanning part outputs X11, X12, X21, X31, X22, X13, X14, 0, 0, X41, X51, 0, 0, 0, X15, X16, 0, 0, 0, X52, and X71. The control signal generation unit of the shape-adaptive scan control part, which receives the transform coefficient position information as shown in FIG. 8C, scans all segments in the same order as in the zig-zag scanning carried out in the shape-adaptive scanning. When the control signal generation unit scans a segment containing a transform coefficient, it generates a control signal for switching on the switch.

The control signal generation unit 242 also outputs a control signal for switching off the switching unit 245-2 when it scans a segment containing no transform coefficient. Thus, the switching unit 245-2 outputs X11, X12, X21, X31, X22, X13, X14, 0, X41, X51, 0, X15, X16, X52, and X71 while receiving inputs of X11, X12, X21, X31, X22, X13, X14, 0, 0, X41, X51, 0, 0, 0, X15, X16, 0, 0, 0, X52, and X71.

On the other hand, the object-based image signal coding apparatus shown in FIG. 12B includes a shape-adaptive scanning part 245 configured to control its scanning operation by a control signal, as compared to the case of FIG. 12A in which the object-based image signal coding apparatus includes a scanning unit 245-1 configured to operate in the same scanning manner as in the conventional scanning method, and a switch controlled by a control signal. In the case of FIG. 12B, a new scanning scheme is defined and used. That is, the shape-adaptive scanning part of FIG. 12B itself operates to skip segments containing no transform coefficient while basically operating in the same manner as in the conventional scanning method. Assuming that this shape-adaptive scanning part 245 basically operates in a zig-zag scanning fashion and receives the transform coefficient position information as shown in FIG. 8C, it carries out a scanning operation in accordance with a new scanning scheme shown in FIG. 8D, in response to a control signal applied thereto. The shape-adaptive scanning part 245 of FIG. 12B may also basically use the scanning scheme as shown in FIG. 7B or 7C. Thus, the scanning scheme intended in this embodiment may be determined in accordance with the input shape information and the basic scanning scheme used. Of course, both the embodiments of FIGS. 12A and 12B provide the same result where the same input shape information and the same basic scanning scheme are used.

Although not shown in FIG. 11 and FIG. 12, the texture information coding part should include a unit adapted to reconstruct an encoded texture information signal. Generally, this unit carries out an inverse quantization procedure and an inverse transform procedure. The resultant reconstructed texture information signal is applied to the adder of FIG. 10.

Figure 14:
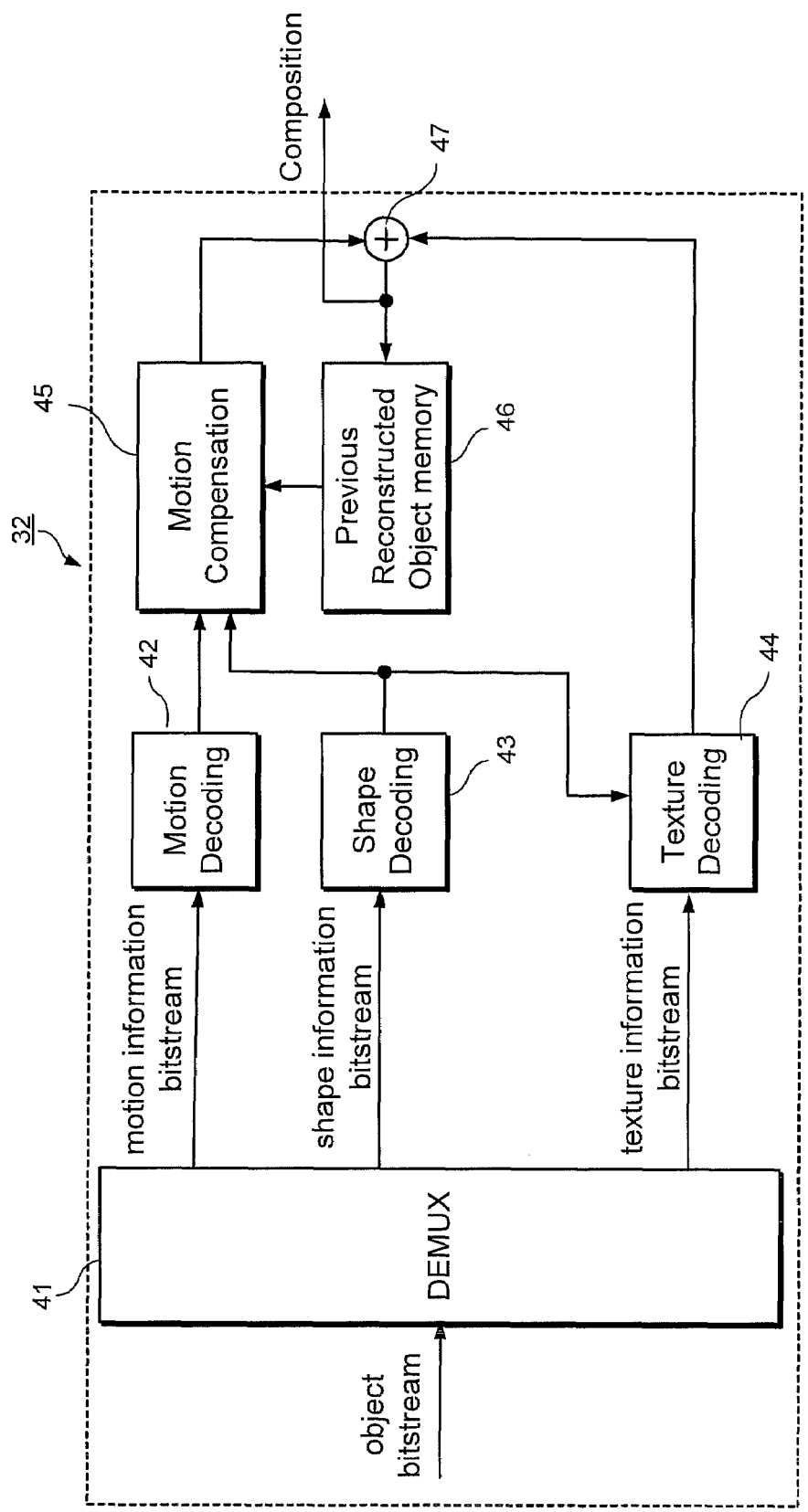
FIG. 14 is a block diagram illustrating an object decoding part according to the present invention.

FIGS. 13 and 14 illustrate an object-based image decoding system in accordance with the present invention. FIG. 13 illustrates a block diagram schematically illustrating an object-based image decoding system according to the present invention. A bitstream, which is received in the object-based image decoding system, is divided into bitstreams respectively associated with objects. The resultant object bitstreams are decoded in an object decoding part 32 in association with objects, respectively. The resultant reconstructed object signals from the object decoder 32 are composed by a composition part 33, thereby generating and displaying a single image signal.

FIG. 14 is a block diagram illustrating a detailed configuration of the object decoding part 32 according to the present invention. Although the object decoding part 32 is shown in FIG. 13 as consisting of a plurality of object decoding units, it practically includes a single object decoding unit which repeatedly performs a decoding operation by n times (32-1, 32-2, . . . , and 32-n) for n objects. The illustration of FIG. 13 is only to emphasize individual decoding operations of the object decoding part 32 for objects. A bitstream, which is received in the object decoding part 32, is demultiplexed into a motion information bitstream, a shape information bitstream, and a texture information bitstream via a demultiplexer (DEMUX) 41. The separated bitstreams are then applied to decoding parts 42 to 44, respectively. The shape information decoding part 43, which receives the shape information bitstream, generates reconstructed shape information. This reconstructed shape information is applied the texture information decoding part 44. The reconstructed shape information is also applied to a motion compensation part 45. Thus, decoding is carried out for each object. That is, reconstruction of pixels only included in the object region is possible. The texture information decoding part 44 receives the texture information bitstream, thereby conducting a texture information decoding operation. In order to decode only the texture information associated with the object region, the texture information decoding part 44 also receives the reconstructed shape information and uses it upon decoding the texture information. The motion information decoding part 42 receives the motion information bitstream, thereby conducting a motion information decoding operation. The motion compensation part 45 carries out a motion compensated prediction, based on the motion information outputted from the motion information decoding part 42 and the previous texture information from a previous reconstructed object memory part 46. Of course, the operation of the motion compensation part 45 is carried out only in association with the object region. To this end, the reconstructed shape information outputted from the shape information decoding part 43 is also applied to the motion compensation part 45. The reconstructed shape information is identical to the reconstructed shape information outputted from the shape information coding part of FIG. 10. A motion compensated prediction signal outputted from the motion compensation part 45 is added to the reconstructed texture information from the texture information decoding part 44 in an adder 47, thereby recovering the associated object. The recovered object is stored in the previous reconstructed object memory 46 so that it is subsequently used upon decoding of the next frame. The recovered object is also applied to a composition part so that it is composed with other objects, thereby reproducing an image signal.

Figure 15:
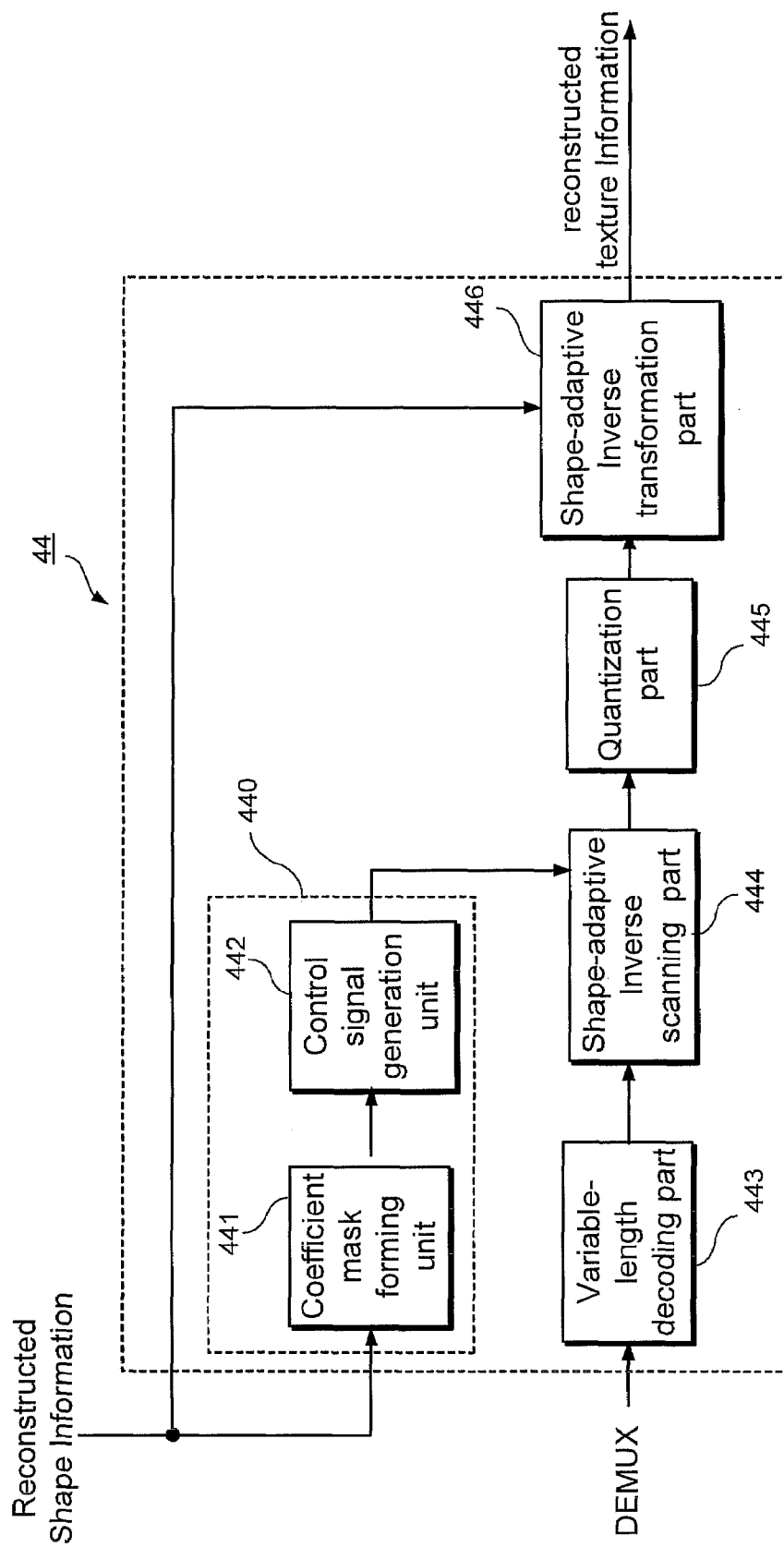
FIG. 15 is a block diagram illustrating an apparatus for object-based decoding of image signals in accordance with the present invention.

FIG. 15 is a block diagram illustrating an apparatus for shape-adaptive decoding of image signals in accordance with the present invention. This apparatus corresponds to the texture information decoding part 44 of FIG. 14. As shown in FIG. 15, the object-based decoding apparatus for image signals according to the invention comprises:

a shape information decoding part for decoding shape information associated with objects and contained in an object bitstream transmitted from a coding apparatus;

a shape-adaptive inverse scan control part 440 for forming a binary coefficient mask, based on said shape information received from said shape information decoding part, and generating an inverse scan control signal in accordance with existence or nonexistence of the coefficient mask;

a shape-adaptive inverse scanning part 444 for performing an inverse scanning operation to arrange transform coefficients of texture information contained in said object bitstream in the form of a two-dimensional signal, based on said inverse scan control signal from said shape-adaptive inverse scan control part; and a shape-adaptive inverse transform part 446 for performing a shape-adaptive inverse transform for the transform coefficients inversely scanned by said shape-adaptive inverse scanning part, based on said decoded shape information outputted from said shape information decoding part, thereby reconstructing texture information of an original image.

The apparatus includes a shape-adaptive inverse scan control part 440 for receiving reconstructed shape information outputted from a shape information decoding part 43, thereby generating a control signal for sorting segments containing transform coefficients from segments containing no transform coefficient so as to control an inverse scanning operation in such a manner that the segments containing transform coefficients are scanned in the well-known scan order while the segments containing no transform coefficient are excluded from the scan order.

The shape-adaptive inverse scanning part 444 of the apparatus which inversely the segments containing transform coefficients while excluding the segments containing no transform coefficient, in response to the control signal generated from the shape-adaptive inverse scan control part 440.

The shape-adaptive inverse scan control part 440 operates in the same manner as the shape-adaptive scan control part 240 of FIG. 11. That is, the shape-adaptive inverse scan control part 440 includes a coefficient mask forming unit 441 adapted to transform the input reconstructed shape information in the same manner as in the shape-adaptive transform coding, thereby forming a coefficient mask which denotes a region of segments having a transform coefficient (transform coefficient region) so as to sort segments containing transform coefficients from segments containing no transform coefficient, and a control signal generation unit 442 adapted to scan the coefficient mask in the same manner as in the scanning of transform coefficients and to generate a signal indicative of whether or not the currently scanned mask segment corresponds to the transform coefficient region.

The shape-adaptive inverse scanning part 444 according to the present invention also receives transform coefficients outputted from a variable-length decoding unit 443 and conducts a inverse scanning operation for arranging those transform coefficients in the form of a two-dimensional signal. During the inverse scanning operation, the shape-adaptive inverse scanning part 444 receives a control signal—a signal indicative of whether or not the currently scanned segment contains an associated transform coefficient—from the shape-adaptive inverse scan control unit 440, in order to skip segments containing no transform coefficient from the scan order. In accordance with the present invention, therefore, it is possible to decode the bitstreams generated by way of reducing the number of zero coefficients unnecessarily inserted irrespective of non-existence of transform coefficients in the case of the conventional scanning methods.

Figure 16B:
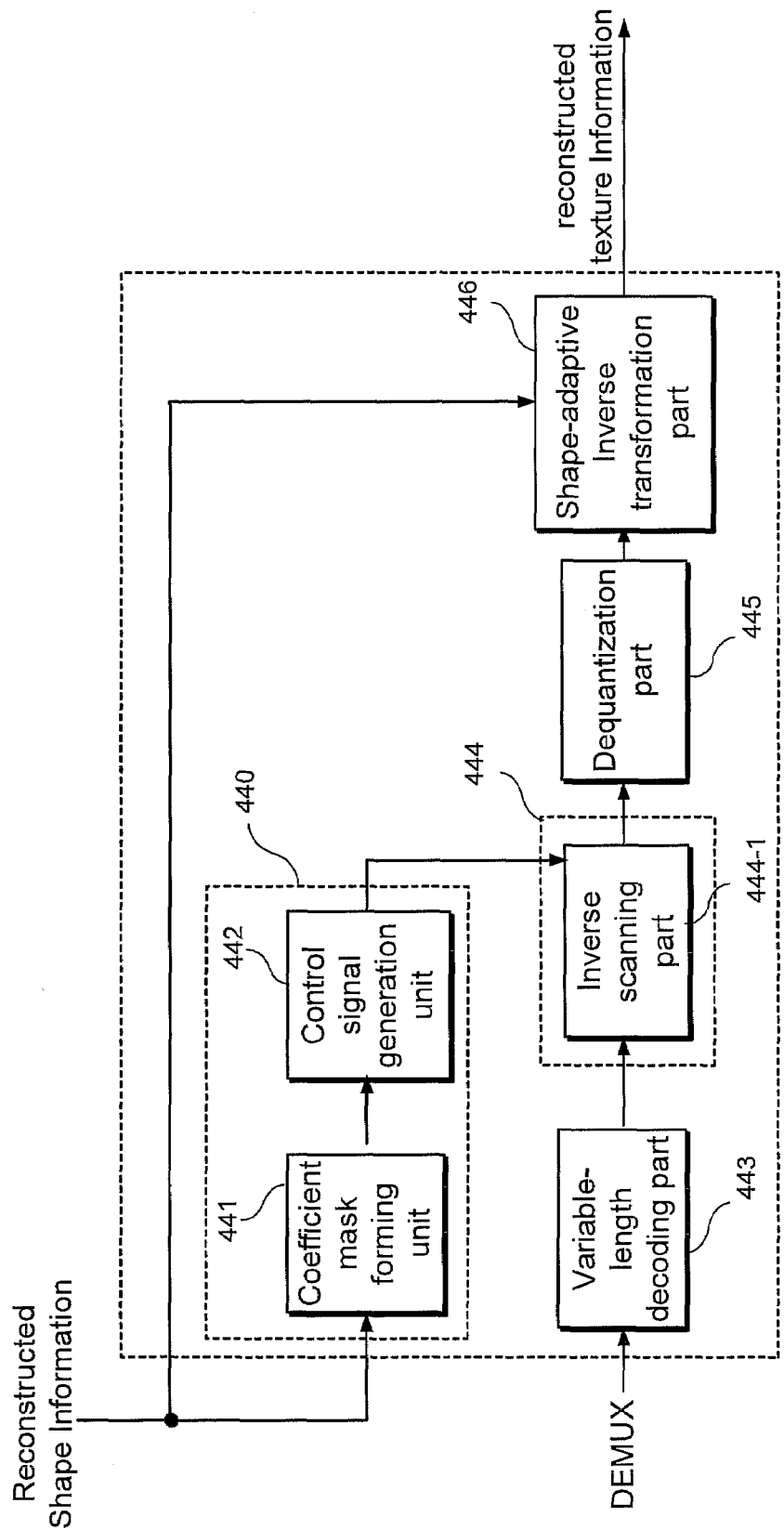

In accordance with an embodiment of the present invention shown in FIG. 16A, the shape-adaptive inverse scanning part 444 is configured so that during its scanning of segments processed by the variable-length decoding, it switches off outputting of scanned transform coefficient values associated with segments containing no transform coefficient, based on a skip signal from the control signal generation unit 442. In accordance with another embodiment of the present invention shown in FIG. 16B, the shape-adaptive inverse scanning part 444 is configured so that during its scanning of segments, it excludes segments containing no transform coefficient from the scan order, thereby skipping them, based on a skip signal from the control signal generation unit 442.

In operation of the apparatus, a variable-length decoding part 443 receives a bitstream of texture information, thereby outputting transform coefficients arranged in a one-dimensional array. The shape-adaptive inverse scan control part 440 has the same configuration as the shape-adaptive scan control part of FIG. 11. The coefficient mask forming unit 441 outputs a coefficient mask for determining whether or not the currently scanned segment contains an associated transform coefficient. This information is applied to the control signal generation unit 442 which, in turn, outputs a control signal indicative of which segments have no transform coefficient while inversely scanning the entire segment in the same manner as in the shape-adaptive inverse scanning part 444. The shape-adaptive inverse scanning part 444 conducts a procedure for re-arranging transform coefficients outputted from the variable-length decoding part 443. Thereafter, a dequantization for the transform coefficients is carried out in a dequantization for the transform coefficients is carried out in a dequantization part 445. The resultant transform coefficients are inversely transformed in a shape-adaptive inverse transform unit 446, thereby reconstructing texture information.

The shape-adaptive inverse scanning procedure according to the present invention will be exemplarily described in conjunction with FIG. 8C. The variable-length decoding part 443 outputs X11, X12, X21, X31, X22, X13, X14, 0, X41, X51, 0, X15, X16, 0, X52, and X71 whereas the shape-adaptive inverse scanning part 444 generates outputs as shown in FIG. 8E. In FIG. 8E, the bright portions correspond to segments containing no transform coefficient. These segments are not subject to an object-based decoding. Even when these segments are filled with arbitrary values, the decoding part is not influenced by them. The inverse scanning unit 444-1 of FIG. 16A is configured to operate in the same scanning manner as in the conventional scanning method while using a switching unit 444-2 controlled by a control signal. On the other hand, the shape-adaptive inverse scanning part of FIG. 16B uses a new inverse scanning scheme as shown in FIG. 8D. The inverse scanning procedure according to the present invention may be carried out using a zig-zag scanning scheme or other scanning schemes.

As apparent from the above description, the present invention provides object-based coding and decoding apparatuses and methods for image signals, wherein upon scanning shape-adaptive transform coefficients of blocks transformed in accordance with a shape-adaptive transform, only segments containing such shape-adaptive transform coefficients are scanned. In the scanning operation, segments containing no transform coefficient are skipped. As a result, it is possible to suppress transmission of unnecessary bits. Accordingly, there are redundant bits which can be used for an improvement in picture quality. This results in an improvement in the quality of image services.

Although the preferred embodiments of the invention have been disclosed for illustrative purposes, those skilled in the art will appreciate that various modifications, additions and substitutions are possible, without departing from the scope and spirit of the invention as disclosed in the accompanying claims.

What is claimed is:

1. An object-based coding apparatus for image signals, comprising:
    a shape information coding part for encoding shape information of an input image signal;
    a shape-adaptive transform part for carrying out a shape-adaptive transform for texture information of said input image signal, based on said shape information outputted from said shape information coding part having an output transform coefficient distribution signal;
    a shape-adaptive scan control part for forming a binary coefficient mask having said same transform coefficient distribution as that of said output signal from said shape-adaptive transform part, and generating a scan control signal in accordance with existence or nonexistence of a transform coefficient based on said binary coefficient mask; and
    a shape-adaptive scanning part for carrying out a scanning operation for an output from said shape-adaptive transform part, based on the associated control signal from said shape-adaptive scan control part.

2. The object-based coding apparatus for image signals in accordance in claim 1, wherein said shape-adaptive scan control part comprises:
    a coefficient forming unit adapted to form a binary coefficient mask for sorting segments containing transform coefficients from segments containing no transform coefficient which has said same transform coefficient distribution as that of said output signal from said shape-adaptive transform part; and
    a control signal generation unit adapted to generate a skip signal for skipping segments containing no transform coefficient from the scanning operation of said shape-adaptive scanning part.

3. The object-based coding apparatus for image signals in accordance with claim 2, wherein said shape-adaptive scanning part is configured to carry out a scanning operation for transform coefficients, based on said skip signal from said control signal generation unit, while skipping segments containing no transform coefficient.

4. The object-based coding apparatus for image signals in accordance with claim 2, wherein said shape-adaptive scanning part comprises:
- a scanning unit adapted to scan the entire segment including segments containing shape-adaptive transform coefficients and segments containing no transform coefficient, but respectively filled with coefficients of a predetermined value; and
- a switching unit adapted to receive an output signal from said scanning unit and to switch off said output signal from said scanning unit, based on said skip signal from said control signal generation unit, when said output signal is associated with a segment containing no transform coefficient.

5. The object-based coding apparatus for image signals in accordance with claim 1, wherein said shape-adaptive scanning part is a zig-zag scan type shape-adaptive scanning part.

6. The object-based coding apparatus for image signals in accordance with claim 1, wherein said shape-adaptive scanning part is an alternate scan type shape-adaptive scanning part.

7. The object-based coding apparatus for image signals in accordance with claim 1, further comprising:
- a quantization part provided between said shape-adaptive transform part and said shape-adaptive scanning part and adapted to quantize transform coefficients outputted from said shape-adaptive transform part; and
- a variable-length coding part provided to an output stage of said shape-adaptive scanning part and adapted to perform a variable-length coding operation in accordance with a generation probability of transform coefficients generated in said scanning operation.

8. An object-based coding method for image signals carried out in an object-based image signal coding apparatus including texture signal encoding part comprising a shape-adaptive transform part adapted to perform a shape-adaptive transform for texture information of an input image signal, based on shape information of object said input image signal having an output transform coefficient distribution signal, along with a shape-adaptive scan control part and a shape-adaptive scanning part, comprising the steps of:
- forming, in said shape-adaptive scan control part and based on said shape information, a binary coefficient mask having a transform coefficient region with said same transform coefficient distribution as that of said output signal from said shape-adaptive transform part and sorting segments containing transform coefficients from segments containing no transform coefficients, thereby generating a binary coefficient mask value; and
- performing a scanning operation of said shape-adaptive scanning part for a transform coefficient outputted from said shape-adaptive transform part, based on said binary coefficient mask value associated with existence or none existence of said transform coefficient.

9. An object-based decoding apparatus for image signals, comprising:
- a shape information decoding part for decoding shape information associated with objects and contained in an object bitstream transmitted from a coding apparatus;
- a shape-adaptive inverse scan control part for forming a binary coefficient mask, based on said shape information received from said shape information decoding part, and generating an inverse scan control signal in accordance with existence or nonexistence of the coefficient mask;
- a shape-adaptive inverse scanning part for performing an inverse scanning operation to arrange transform coefficients of texture information contained in said object bitstream in the form of a two-dimensional signal, based on said inverse scan control signal from said shape-adaptive inverse scan control part; and
- a shape-adaptive inverse transform part for performing a shape-adaptive inverse transform for the transform coefficients inversely scanned by said shape-adaptive inverse scanning part, based on said decoded shape information outputted from said shape information decoding part, thereby reconstructing texture information of an original image.

10. The object-based decoding apparatus for image signals in accordance with claim 9, wherein said shape-adaptive inverse scan control part comprises:
- a binary coefficient mask forming unit adapted to receive said reconstructed shape information from said shape information decoding part and to form a shape-adaptive transform binary coefficient mask for sorting segments containing transform coefficients from segments containing no transform coefficient; and
- a control signal generation unit adapted to generate a skip signal from skipping segments containing no transform coefficient from a scan order in the scanning operation of said shape-adaptive inverse scanning part.

11. The object-based decoding apparatus for image signals in accordance with claim 10, wherein said shape-adaptive inverse scanning part is configured to carry out an inverse scanning operation for transform coefficients, based on said skip signal from said control signal generation unit, while skipping segments containing no transform coefficient.

12. The object-based decoding apparatus for image signals in accordance with claim 10, wherein said shape-adaptive inverse scanning part comprises:
- a switching unit adapted to receive transform coefficients of texture information contained in said object bitstream and to switch off said output signal from said inverse scanning unit, based on said skip signal from said control signal generation unit, when said output signal is associated with a segment containing no transform coefficient; and
- an inverse scanning unit adapted to scan the entire segment including segments containing shape-adaptive transform coefficients and segments containing no transform coefficient, but respectively filled with coefficients of a predetermined value.

13. The object-based decoding apparatus for image signals in accordance with claim 9, wherein said shape-adaptive inverse scanning part is a zig-zag scan type shape-adaptive inverse scanning part.

14. The object-based decoding apparatus for image signals in accordance with claim 9, wherein said shape-adaptive inverse scanning part is an alternate scan type shape-adaptive inverse scanning part.

15. The object-based decoding apparatus for image signals in accordance with claim 9, further comprising:
- a variable-length decoding part provided in front of an input stage of said shape-adaptive inverse scanning part and adapted to receive said texture information contained in said object bitstream, thereby outputting transform coefficients arranged in a one-dimensional array; and a dequantization part provided between said shape-adaptive inverse scanning part and said shape-adaptive inverse transform part and adapted to dequantize said inversely-scanned transform coefficients.

16. An object-based decoding method for image signals carried out in an object-based image signal decoding apparatus including texture information decoding means comprising a shape-adaptive inverse scanning control part, a shape-adaptive inverse scanning part and a shape-adaptive inverse transform part adapted to perform a shape-adaptive transform for texture information of an input image signal, based on shape information of object of said input image signal, comprising the steps of:

forming, in said shape-adaptive inverse scan control part and based on said shape information, a binary coefficient mask adapted to sort segments containing transform coefficients associated with said objects from segments containing no transform coefficient, thereby generating a binary coefficient mask value for each of the segments; and performing an inverse scanning operation of said shape-adaptive scanning part, for a transform coefficient outputted from said shape-adaptive transform part, carried out to arrange transform coefficients of said object bitstream in the form of a two-dimensional signal, in accordance with the existence or nonexistence of said binary coefficient mask value associated with said coefficient mask.

\* \* \* \* \*